(12) United States Patent
Warmerdam

(10) Patent No.: US 11,805,742 B2
(45) Date of Patent: Nov. 7, 2023

(54) FRICTIONAL DRAINAGE LAYER IN A GREEN ROOF, PAVER, AND/OR SOLAR ASSEMBLY

(71) Applicant: GREEN ROOF SPECIALTY PRODUCTS LLC, Culpepper, VA (US)

(72) Inventor: Oscar Warmerdam, Culpepper, VA (US)

(73) Assignee: Green Roof Specialty Products, LLC, Culpeper, VA (US)

( * ) Notice: Subject to any disclaimer, the term of this patent is extended or adjusted under 35 U.S.C. 154(b) by 0 days.

(21) Appl. No.: 17/259,965

(22) PCT Filed: Jul. 16, 2019

(86) PCT No.: PCT/US2019/042086
§ 371 (c)(1),
(2) Date: Jan. 13, 2021

(87) PCT Pub. No.: WO2020/018599
PCT Pub. Date: Jan. 23, 2020

(65) Prior Publication Data
US 2021/0282335 A1   Sep. 16, 2021

Related U.S. Application Data

(60) Provisional application No. 62/698,316, filed on Jul. 16, 2018.

(51) Int. Cl.
*A01G 9/033* (2018.01)
*E04D 11/00* (2006.01)

(52) U.S. Cl.
CPC ............ *A01G 9/033* (2018.02); *E04D 11/002* (2013.01)

(58) Field of Classification Search
CPC .... A01G 9/033; E04D 11/002; Y02A 30/254; Y02B 80/32
See application file for complete search history.

(56) References Cited

U.S. PATENT DOCUMENTS

| 4,534,142 A | 8/1985 | Drefahl |
|---|---|---|
| 5,589,240 A | 12/1996 | Hunter |
| 5,836,107 A | 11/1998 | Behrens |
| 9,440,411 B2 | 9/2016 | Hellwig |

(Continued)

FOREIGN PATENT DOCUMENTS

| EP | 0475489 A1 | 3/1998 |
|---|---|---|
| EP | 0875637 A2 | 11/1998 |

(Continued)

OTHER PUBLICATIONS

International Search Report issued in PCT/US19/42086, dated Oct. 10, 2019.

*Primary Examiner* — Babajide A Demuren
(74) *Attorney, Agent, or Firm* — Akerman LLP; Timothy K. Sendek

(57) ABSTRACT

Certain exemplary embodiments can provide a system, machine, device, and/or manufacture that is configured to operably manage a flow of storm water that enters a drainage system of a roof and comprises one or more of a retention layer configured to retain storm water, a friction layer configured to delay a peak flow of the storm water into the drainage system, and a detention layer.

2 Claims, 16 Drawing Sheets

(56) References Cited

U.S. PATENT DOCUMENTS

| | | |
|---|---|---|
| 2004/0074164 A1 | 4/2004 | Behrens |
| 2010/0215924 A1 | 8/2010 | Di Pede |
| 2011/0067325 A1* | 3/2011 | Modica ................ E04D 11/002 52/302.1 |
| 2013/0133258 A1 | 5/2013 | Carter |
| 2013/0333285 A1* | 12/2013 | Buist ..................... A01G 9/027 47/65.9 |
| 2017/0175395 A1 | 6/2017 | Freeman |

FOREIGN PATENT DOCUMENTS

| | | | |
|---|---|---|---|
| JP | 2002315431 A | * | 10/2002 |
| JP | 2002315431 A | | 10/2002 |

\* cited by examiner

FRICTIONAL DRAINAGE LAYER IN A GREEN ROOF, PAVER, AND/OR SOLAR ASSEMBLY

CROSS-REFERENCE TO RELATED APPLICATIONS

This application is the U.S. National Stage of International Application No. PCT/US2019/042086, filed on Jul. 16, 2019, which claims the benefit of U.S. Provisional Application Ser. No. 62/689,316, filed on Jul. 16, 2018, the entire contents of both are hereby incorporated by reference.

BACKGROUND

Green roof assemblies and/or systems can be installed as storm water management tools that can reduce storm water volume on a building's roof. In certain exemplary embodiments, a green roof assembly can act somewhat analogously to a sponge and/or a storage cup for rainwater that falls onto a building. That is, a green roof system can resist and/or prevent rain water from rapidly entering the drain system and/or sewer system that services the building and/or can resist and/or prevent rain water from rushing from the roof of the building and into open bodies of water.

In certain exemplary embodiments, a green roof system can be defined in part by its "profile," which can be defined as a vertical stack of components and/or "layers," that stack typically viewed as a side view of a cross-section of the system created by a vertically extending plane. For example, certain exemplary embodiments of a green roof system can include a layer of living plants at the top of the profile, soil located below the plant layer. In certain exemplary embodiments, a green roof system profile can include and/or be located above a "drainage layer," which can be defined by the soil layer and/or by one or more other materials located below the soil layer. A green roof system profile can include one or more "retention layers," which can be located within, adjacent, above, and/or below the drainage layer.

Certain exemplary green roof systems can utilize an array of materials to manage, control, and/or maximize the retention performance of the system by storing water in cup-like materials and/or gravel-type materials that can be placed underneath the soil profile (i.e., that portion of the overall profile occupied by soil). In certain exemplary embodiments, water can be stored in a green roof system profile through a process called adhesion and/or via capillary processes that can retain the water somewhere in the profile above the drainage layer, which can be the soil and/or different forms of capillary oriented retention layers such as needled mineral wool.

A green roof assembly can have a layer of vegetation on top. The roots of the vegetation can grow in a soil layer that is underneath. This soil layer can hold between approximately 25% to approximately 60% of water by weight. The green roof assembly can have an additional retention layer included somewhere in the profile that, by itself, can retain between approximately 5% to approximately 95% of its volume in water. More storm water can be captured in the green roof assembly if the drainage layer used has a cup design that can receive storm water and hold it over a longer term. Severe storms can cause the cups to overflow at which point these cups release the water. The soil, the retention layer, and/or any cup designed into the storm water solution can be configured to retain as much water as possible, so that less water leaves the system. In certain exemplary embodiments, a green roof can be placed on top of a drainage layer. This drainage layer can be configured to promote and/or facilitate water movement from underneath the green roof profile to the drains so that excess rainfall, which cannot be held in retention by the green roof profile itself, can move substantially freely to the drain. Certain exemplary embodiments can include roof drains and/or bio-retention devices, either of which can provide a restriction device at the outflow point.

Certain exemplary green roof systems can utilize one or more plastic drainage layers. These layers can include water storage cups and/or a 3-dimensional plastic-type thread/wire filament layer, which can be configured to promote and/or facilitate water flow. In certain exemplary embodiments, the drainage layers can have cloths adhered to them on one or both sides, and/or a cloth layer can be added to the drainage layer to keep the soil from washing out. In certain exemplary embodiments, the added cloth itself can have a capillary capacity configured to increase the retention capacity of the system. Certain exemplary green roofs can be installed using "green roof trays" via which all or some of the above elements and/or layers can be incorporated into the tray design. An array of trays can be arranged substantially as a horizontally extending plane. For example, if the trays are square when viewed from about, the square trays can be arranged to completely cover a rectangular area of the underlying roof, thereby forming a modular green roof assembly. Certain exemplary embodiments can incorporate granular and/or gravel products that can fill up a void space between the green roof assembly and the building roof, which can facilitate water retention and/or release by the green roof.

With respect to certain exemplary embodiments, one difference between retention and detention can be that retention can be treated as a static value expressed in total volume of storm water, yet detention can be treated as a dynamic value expressed in storm water volume over time.

Within the context of certain exemplary embodiments, water that is prevented from draining from a surface is referred to as "retained water" and/or "retention", which water can escape only upwards through evaporative processes, such as evaporation, evapotranspiration, and/or uptake by plants. Retention can be measured in liquid volume, such as gallons or cubic feet.

Storm water retention can help satisfy policy requirements by lowering average storm water runoff volume throughout the year. For example, if a green roof retains most of the volume of most storms, then the green roof has lowered average storm water runoff.

Determining retention can involve calculating the maximum green roof assembly capacity to retain water as a fixed number. A strategic consideration of retention can be to hold as much water as possible in the soil, cups, and/or retention layers of the green roof assembly. Any rainwater that falls onto the green roof assembly in excess of the retention capacity usually leaves the roof almost instantly.

Retention may be measured by known standards. For example, ASTM 2397 submerges a fully dried 600 gram soil sample under water for 24 hours. After that period, it is removed from the water tank and immediately weighed. If the sample weight at time of removal from the tank was 1.4 kg, the 1.4 kg is the sum of the dry soil, water held in the micropores, and water held for just a brief moment in the macropores). Next, it is allowed to drain for 2 hours which reveals how much water is held through capillary action in the micropores, (and now it weighs 1 kg thus it holds 400 gram of water in the micropores). The 400 gram of water that drained out immediately after the sample was removed from the tank was inside of the soil sample in what is termed macropores.

Filling macropores on a green roof so it replicates nature can be desirable. This can be achieved by restricting the outflow at the bottom of the profile in the lateral direction of the drain. This can be achieved by creating lateral friction/flow rate resistance in the lateral drainage layer which slows the outflow such that water backs up into the voids of the Swiss cheese-like soil of green roof assembly. The result is that the temporary backing up of the water in the profile holds the rain event largely in place on the roof, with a reduced and controlled outflow rate that is substantially less than the peak moment of the rain event itself with the goal to lower the peak flow volume (outflow), and to delay the peak flow moment.

The drawback of using retention as a storm water management strategy for a green roof assembly is that these systems can need time to recharge, often 7-10 days, before they can accept another rain event. Retention based systems can work well on average throughout the year, but they do not necessarily work well when 2 large storm events happen within 48 hours. For this reason, some civil engineers do not consider retention valuable because it takes 7-21 hours for that retention capacity to empty out and be available again.

Regarding certain exemplary embodiments, water that is temporarily held on a surface, in a container, or within a storm water management device such as a green roof assembly, or otherwise slowed before being released to a drain is referred to as "detained water" or "detention." Detention can be measured in volume (peak flow reduction), time (peak flow delay), and/or rate (volume over time, considering both peak flow reduction and peak flow delay). Greater detention benefits can be provided by higher peak flow reduction and/or higher peak flow delay.

Detention can add a time component, as a detention-based storm water management strategy can be focused on creating an intentional time delay for the rain water that falls onto the green roof assembly in excess of the retention capacity. Delaying the peak outflow and lowering the peak outflow of this excess volume does not necessarily equate to lowering the excess outflow volume as a whole. A detention-based storm water management strategy can aim to lower any outflow volume intensity and/or cause a time delay so that subsequent storm water systems downstream have time to recharge their own capacity, so they can receive the water from the green roof without causing a flood.

Certain exemplary implementations of storm water detention can help reduce peak flow rate. Storm water management infrastructure, such as storm sewer pipes, can possess a maximum flow rate capacity, e.g., from 100 cubic feet per minute to 500 cubic feet per minute, including all values and sub-ranges therebetween, such as 154, 201, 277, 300, 397, and 450, etc. cubic feet per minute. During intense rain storms, such infrastructure might only need to operate at full capacity for a brief period such as 5 minutes, or 10 minutes or 1 hour. If more water attempts to flow into such infrastructure than capacity allows, resulting damage can include flooding, erosion, emergency overflows, and/or damage to infrastructure. Lowering peak runoff from individual surfaces, such as can be provided by certain exemplary embodiments, can collectively lower the potential for such damage.

Certain exemplary implementations of storm water management devices that implement retention can have a finite retention volume, or retention capacity. An exemplary system that is retaining substantially the amount of its capacity can be referred to as saturated. Once a system is saturated, the system cannot retain any more volume until at least a portion of the retained water has escaped, such as through evaporative processes.

When additional water is applied to a retention-oriented system that is saturated, the system will produce an approximately equivalent amount of runoff, i.e., water exiting the system via a kinetic action. That is, inputs added after saturation need not travel through the system, but the input can enter the system and be retained by the system, and the system can push out an approximate equivalent volume.

The speed at which this kinetic action can occur can be determined by the system's ability to mitigate or counteract gravitational forces.

Within the field of civil engineering and storm water management, storm increments are commonly measured in 5-minute time segments (Europe) or 6-minute time segments (North America). Storm water runoff that occurs within a single time segment is considered to be instantaneous with no detention, that is runoff (draining of water from a surface) that occurs within a single time segment (such as within 5 minutes, or such as within 6 minutes) of rainfall occurrence is considered to be instantaneous. As used herein, the terms "instant runoff" and "no significant detention" refer to storm water runoff occurring within 5 minutes of rainfall occurrence.

Storms can be classified according to Type, where Type indicates the duration and/or intensity of the storm. "Pacific storms" or Type 1 or 1A storms can be characterized by long lingering rain events of many hours, or even multiple days. "Narrow storms" or Type 2 storms can arrive quickly, have a fast-rising peak, and/or a rapid decline, such that as quickly as they arrived, they leave again. "Wide storms" or Type 3 storms can slowly build up, need not peak as high, and/or decline more slowly. "Hurricane storms" can be heavy storms that are excessively extended.

Local building codes can define what storm type and/or what peak volume a storm water management system must handle (i.e. retain runoff volume and/or detain runoff volume). For instance, a local building code might define a 2-year storm and a 10-year storm, or a 2-year storm and a 25-year storm. The 2-year storm might be a relatively small storm, but this requirement can ensure that the storm water solution can handle larger as well as smaller storms.

The 10-year or 25-year storms are usually very substantial storms (for instance 2-5 inches of rainfall in a 6-hour time frame) that have a significant impact on pollution, erosion, sewer overflows, flooding, and/or infrastructure damage. Such larger storms are the storms that place the highest demand on storm water infrastructure, as previously discussed. Thus, peak flow reduction and/or peak flow delay during these storms can provide the greatest benefits, benefits which are primarily provided by increased detention capacity versus increased retention capacity.

As extreme rain events often cause the most pollution, erosion, flooding, and/or other physical damage to a city and/or property, benefits can be achieved by design of certain exemplary storm water management devices, including rooftop storm water management devices, that are configured to handle extreme rain events. As retained water primarily or only exits a storm water management system via evaporative processes, time and appropriate weather conditions are required after the system is saturated before the system regains significant retention capacity. For example, a retention-oriented green roof that retains 1 inch of water might require 7 to 10 sunny days after a storm before the system has regained most of its retention capacity. For this reason, retention-oriented green roofs might retain an insignificant volume of additional water during repeat storms, extreme rain events, or large storms. However, detention-oriented approaches can potentially recharge much more quickly, as release of water from a detention-oriented storm water management device is not dependent on climatic conditions. That is, certain exemplary embodiments of detention-oriented assemblies can function regardless of whether the assembly is in a non-saturated state or a saturated state. Storm water management systems can incorporate both retention and detention.

Rooftop storm water management systems can be classified broadly as either "green roofs" or "blue roofs."

Certain exemplary embodiments of a green roof can comprise layers of horticultural and/or other materials that are placed over a roof of a building, a waterproofing membrane, and/or another substantially impervious surface. Certain exemplary green roofs can be vegetated.

Certain exemplary green roof systems can be defined in part by their profiles, which can be defined as a vertical stack of substantially horizontal components and/or layers. For example, certain exemplary embodiments of a green roof system can include a layer of living plants at the top of the profile, and soil located below the plant layer. In certain exemplary embodiments, a green roof system profile can include and/or be located above a "drainage layer," which can be defined by the soil layer and/or by one or more other materials located below the soil layer. An exemplary green roof system profile can include one or more "retention layers," which can be located within, adjacent, above, and/or below the drainage layer.

Another exemplary rooftop storm water management device is a blue roof. Blue roofs can store gravitational water, or ponding water, over a waterproofing membrane via a Containment strategy.

Certain exemplary embodiments of green roofs and/or blue roofs can be deployed as mutually exclusive systems or as hybrid systems.

Rooftop storm water management strategies can be related to hydrologic phenomena. Rooftop storm water management strategies may be classified broadly as absorption, containment, or continuous delayed flow. Green roofs can utilize absorption. Blue roofs can utilize containment. Either can utilize continuous delayed flow.

Absorption is a rooftop storm water management strategy that can be defined as holding water (as retention and/or detention) within pore space of a material, via processes such as adhesion and/or storage within capillary pores. Absorption also can be defined to include water that is held in a shallow surface areas of the soil profile (such as dimples in the soil) that create puddles during an excess rain event.

A green roof assembly can have a layer of vegetation on top. The roots of the vegetation can grow in a soil layer that is underneath.

Certain exemplary embodiments of green roofs can incorporate various materials, generally referred to as "plant growth media" or simply "media," which can be used as a horticultural material and/or Absorptive material to increase retention. Such green roof media can be comprised of soil and/or engineered soil-like materials, including: natural porous materials such as bone and/or lava type products such as pumice; other natural materials such as sea shells (e.g., oyster shells); man-made heat-altered materials such as expanded rock, expanded glass, and/or ceramics; natural mineral materials such as gravel and/or crushed rock; and/or natural organic materials such as bark, wood chips, and/or compost. Media can be configured as a place for the plants to root and/or for creation and maintenance of a soil-based ecosystem that can biologically support plants.

Media can provide absorption, which can allows plant roots to absorb water. Absorption in media can occur within voids internal to particles and/or between particles that generally can be classified as "capillary space" and "pore space."

Capillary action (sometimes called capillarity, capillary motion, capillary effect, and/or wicking) can be defined as the ability of a liquid to flow in narrow spaces without the assistance of, or even in opposition to, external forces such as gravity. Capillary spaces can include fine channels and/or gaps between materials that can hold water in opposition to gravitational forces by a process called capillary adhesion. That is, water need not drain out of capillary spaces due to forces of gravity. Adhesion can allow the water to remain in capillary pores and/or wrapped as a film around small particles for an extended period of time, during which that water can be available to the plant and/or to evaporation. Thus, such adhesion can facilitate retention.

As compared to capillary spaces, "pore spaces" in media can be larger diameter channels that generally can allow water to drain in response to gravitational forces are stronger than the capacity of the soil particles to retain the water. Therefore, most to all water in non-capillary pore space can rapidly drain from the soil into layers below and/or out of the green roof system, providing no significant detention. As a result, when soil reaches substantial saturation, additional rainfall inputs to a soil can result in instantaneous storm water runoff.

Media can provide some disadvantages as a primary means of storm water management. The capacity of a media to retain water can be highly variable as different moisture contents prior to a storm can produce different storm water performance outcomes. Also, the content and therefore the performance of media can change over time, such as due to an increase or decrease of organic matter (humus), an increased presence of roots, and/or soil erosion. Media can have a high degree of inconsistency per batch, increasing unpredictability of storm water performance. Further, medias generally can have a high degree of dry weight, or non-water weight per unit of water retained. For example, some media can retain 1.0 pounds of water per 5 pounds of that media, while other media can retain only 0.5 pounds of water, thereby placing higher structural demands on the roof of a building to retain a similar volume of storm water. Subsequent to a media becoming saturated, it typically will not retain or detain storm water of any sizable consequence for a considerable time thereafter (for instance, within approximately 12 to approximately 96 hours).

Certain exemplary green roof assemblies can incorporate fibrous or foamed natural or synthetic materials. Fibrous or foamed synthetic materials can facilitate absorption and thus can provide retention benefits. Such materials can absorb between approximately 5% to approximately 97% of their volume in water.

Certain exemplary green roof assemblies can incorporate mineral wool, glass wool, slag wool, rock wool, and/or other man-made and/or heat-spun fibers to increase retention in green roof assemblies. These materials can be highly retentive, retaining on average from approximately 80% to approximately 95% of their volume in water. These materials can retain such high volumes of water due to composition almost entirely of capillary space. As capillary spaces can hold water via adhesion, water is unable to flow through capillary space easily, so these materials provide negligible detention.

Capillary cloths, which also can be referred to as capillary fabrics or water retention mats, are man-made fabrics comprised of fibers, such as non-woven synthetic felts, but also can be comprised of natural products such as wool, animal fur, and/or human hair. Capillary cloths can retain approximately 30% to approximately 60% of their volume in water and/or can be available in thicknesses of approximately 0.50 inches or less, such as between approximately 0.125 inches and approximately 0.25 inches.

Other exemplary embodiments of fibrous or foamed materials can employ a variety of other man-made and/or synthetic materials for their retention properties. Such materials can include fibers made of metals, plastics, rubber, glass, carbon, microfibers, woven fabrics, carpets, or matrix structures of woven fabrics or fibers. These and/or other materials can be clumped, meshed, stacked, folded, formed as mats, formed in a random matrices, and/or randomly distributed in a 3 dimensional shape. Yet product inconsistency and/or density issues can cause these materials to have unreliable hydrological properties with little flowrate precision.

The aforementioned examples of heat-spun fibers and capillary cloths can perform storm water management functions similarly. Before reaching saturation, such materials can absorb nearly all rainfall to which they are exposed and can hold such water in capillary space. Upon saturation, these materials neither absorb nor detain any significant volumes of water, as additional water inputs can result in one of two actions. In materials with a high degree of pore space, such as capillary cloths that retain only 30% water per volume, water can flow through pore space and can be almost immediately released due to gravitational forces, resulting in no significant detention. In materials that have a very high degree of capillary space, such as mineral wool that retains 97 percent of its volume in water, additional water inputs can create a kinetic action that displaces substantially the same volume of water lower in the profile, resulting in instantaneous runoff, and thus no significant detention. Another exemplary embodiment of synthetic materials utilized for Absorption are granular products that retain water. Silicone based particles readily absorb water, however the ability to super absorb water does not allow the material to release this water very likely. Products such as these are good for retention, but do not offer assistance in detention.

Another exemplary embodiment of synthetic materials utilized for Absorption is the Zeager Mat by Zeager Brothers. This example utilizes various recycled foams and foam rubbers from athletic shoes to produce a semi-absorbent drainage mat that may be used below a green roof profile. Foam and foam rubber generally have very low absorption properties, and thus provide negligible retention benefits. Such materials may potentially be useful in providing detention benefits if used as a Flow Restrictor in combination with other embodiments, however their randomness and density inconsistencies do not allow for these products to be used as a reliable detention tool that a civil engineer needs to use in their calculations. Civil engineers tend to place their trust in man-made, machined products with a high degree of predictability and consistency.

Containment is a rooftop storm water management strategy that incorporates three basic elements: a collection area, a container, and a flow restrictor. A collection area is a three-dimensional area designated to collect water. A container is a substantially impervious element that causes water to collect, i.e. prevents water from immediately exiting, the collection area. A flow restrictor is a pervious or semi-pervious element or location within the container that allows a certain volume of water to pass through the container, i.e. to leave the collection area, at a specific rate, or at a maximum rate. A flow restrictor and a container may be fabricated of the same or different materials; a flow restrictor may be a distinct area within the container, e.g. the flow restrictor may be a single perforation or multiple perforations within the container; or the flow restrictor may be substantially indistinguishable from other areas of the container, such as if the entire container is fabricated of semi-pervious material.

Within containment systems, the flow restrictor allows a maximum flow rate that is substantially lower than the flow rate within the collection area. For example, the collection area may possess an unobstructed cross section measuring 2-inches high by 24 inches wide, which might permit a maximum through flow-rate of approximately 950 gallons per minute, but the flow restrictor may be a single 0.125-inch diameter orifice through the container, which allows a maximum through flow-rate of 1.5 gallons per minute. If the container were 2-inches×24-inches×24-inches, or 5 gallons, without the flow restrictor, the system could be expected to drain completely within seconds, but with the flow restrictor the system might require approximately 3.3 hours to drain. Thus a differential in maximum potential flow rates is critical to a containment system collecting water within the collection area.

A blue roof is one exemplary embodiment of rooftop storm water management system that utilizes containment. Certain exemplary embodiments of a blue roof utilize a waterproofing membrane as the container and weirs or restrictors at the drains as flow restrictors. Such flow restrictors may be a substantially impervious covering or barrier around a drain, with gauged perforations or orifices that allow water to be released to drains at a specific rate, commonly gauged so that a completely filled blue roof will substantially drain within 72 hours.

Variations of the above embodiment may incorporate flow restrictors at various locations of the roofing membrane, versus only around roof drains. Such an embodiment could substantially increase the potential volume of water that could be retained or detained on sloped roofs. Though blue roofs may provide retention or detention, blue roofs are commonly configured to provide detention, as the stagnant water resultant of blue roof retention embodiments presents numerous public health problems.

Blue roofs present a number of design, installation, and maintenance challenges. One challenge is that blue roofs require a higher quality of waterproofing membrane and higher degree of craftsmanship than do roofing membranes that are not subject to prolonged hydrostatic pressure. Blue roofs that freeze during winter months of the year will create blocks of ice that will apply pressure onto seams, vertical flashings and penetrations, which are also areas where roof membranes are the weakest. Free draining roofs do not have this problem and is highly preferred by manufacturers. Most commercially available waterproofing membranes are not warrantable below prolonged hydrostatic pressure or ponding water. Unlike roofs which do not pond water, on a blue roof any minor defect in the membrane material or installation craftsmanship dramatically increases the potential of a membrane leak.

Another challenge is anchoring the walls or check dams that are necessary to create the container and flow restrictors; such anchorage would necessarily be substantially water-tight at the base of wall or check dam, which would require mechanical anchorage such as bolts, or adhesives; both present highly undesirable waterproofing conditions.

Another challenge is location of walls or check dams necessary to create the container and flow restrictors on slopes above approximately 0 percent. Local building codes typically require a minimum roof slope of 2-percent. On very low-slope roofs, such as 2-percent or 24 inches rise per 100 feet run, detention of 1 inch of water would require 2-inch height walls or check dams approximately every 8 linear feet of run, rendering a blue roof solution too costly or impractical on most roofs.

Similar to above, another significant challenge is the inherent geometric irregularity of most roof surfaces, which contain crickets, ridges, peaks, valleys, and geometric imperfections, all of which complicate and may make infeasible, utilization of walls or check dams necessary to create the container and flow restrictors.

Another challenge is maintenance of flow restrictors. Orifices in flow restrictors are necessarily small, and subject to clogging by leaves or debris. In the wintertime frozen water in the orifices of the flow restrictor may prevent the reliable and consistent performance of the blue roof. Lack of frequent maintenance may lead to unpredictable results over time.

In many municipalities and cities across America mosquitos are a nuisance that can be easily avoided if one minimizes shallow puddles where mosquitos can easily breed. Blue roofs are a liability as they almost always leave shallow puddles in areas across the roof, thereby becoming breeding grounds for these insects, and many cities prevent blue roofs as a consequence to protect public health.

A final noted challenge with blue roofs relates to structural concerns. Though blue roofs can be installed on roofs with some degree of slope, as slope increases, point loading around low points, such as roof drains, becomes an increasing concern. That is water will congregate at low points in the roof, thus adding significant extra weight at low points in the roof, which requires increased structural capacity at those low points. Certain buildings cannot handle substantial extra point load weight near the drain, and instead need the weight of storm water to be distributed substantially evenly across the roof Increasing point loads on certain roofs is possible but can increase the cost and/or complexity of a building design.

Another exemplary embodiment of rooftop storm water management that utilizes containment is a green roof that incorporates flow restrictors. Such an embodiment causes water to pond or back up within or below the green roof profile.

One such example is the Tray System by Columbia Green Technologies. In this embodiment, a plastic tray is the container that incorporates flow restrictors or 'metered-outflow'. The flow restrictors, effectively are creating some detention themselves, however once the excess water leaves the container, the bottom of the container is a water movement facilitator and expedites water to the drain. The distance (and therefore time) to the drain offers the most detention capacity, not the holes in the horizontal plane of the container. In addition, when the rainfall exceeds the capacity of the soil to absorb the rainwater, or the container is saturated and the outflow rate is less than the inbound rainfall, the standing water will escape through the gaps between the trays which is the pitfall of all green roof tray systems, thereby missing the opportunity to create a more substantial time delay from where it landed on the horizontal deck to the drain.

Another problem with the above embodiment is that flow restrictors may easily be clogged by soil particles or plant matter. When flow restrictors clog, not only does the system cease to function as a retention or detention device, but sustained super-saturated conditions persist, depriving horticultural media of oxygen, and harming or killing plants.

Another example of green roof that incorporates containment is the HydroVentive green roof by Vegetal ID. In this embodiment, a green roof is positioned above a container. Rainwater falls onto the green roof soil, and excess water flows downward into the container below. The container is capable of wicking water back up to the green roof, which then escapes the system via evapotranspiration, and the container also incorporates flow restrictors to slowly release water, effectively creating detention. In addition, when the rainfall exceeds the capacity of the soil to absorb the rainwater, or the container is saturated, and the outflow rate is less than the inbound rainfall, the standing water will escape through the gaps between the trays which is the pitfall of all green roof tray systems. Once the water falls through the gaps it hits the roof deck and will be facilitated to the drain in an expedited fashion, thereby missing the opportunity to create a more substantial time delay from where it landed on the horizontal deck to the drain.

One problem with the above embodiment is the high degree of manufacturing precision necessary to create flow restrictors small enough to release water over an extended period of time without clogging due to organic buildup like moss, fungi or other biological systems. One solution to this problem is utilization of pumps so that flow restrictors are active, versus passively allowing gravitational flow.

Addition of pumps creates another problem of complexity and multiple points of failure. Pumps in the above embodiment are controlled by computerized systems that require monitoring.

Another problem is that is common to both the aforementioned green roofs that incorporate containment is that during extreme rain events, when the container is fully saturated, additional water inputs creates a kinetic action that results in an immediate equivalent volume of runoff. This results in either the flow restrictors allowing water to exit, or more likely results in the container overtopping, and water flowing over the rim of the container; either condition results in water flowing without any detention to roof drain, thus providing no detention in extreme rain events.

In certain exemplary embodiments, a green roof system may incorporate a drainage layer constructed of substantially impervious, synthetic material, such as plastic, formed into plates with series of cup-shaped indentations that may hold gravitational water, and thus may provide containment. Such cup-shaped indentations could be provided with small drainage holes as flow restrictors; however, problems noted above related to flow restrictors in green roofs trays is compounded at the scale of indentations in drainage composites, rendering detention impractical in these devices. Further, most available cup-type drainage plates hold approximately 0.05 to 0.2 gallons of storm water per square foot of surface area, an insignificant volume of water to provide any significant detention benefit.

Once cups or containers are filled, they can only empty through a process called diffusion or the water is removed through root absorption. Diffusion of any sizable consequence will require the soil above to be almost fully dry, but this is often at the point of plant loss and this takes substantial time. Relying on roots to draw the cups empty is only effective in situations where the cups are very regularly filled with water. This happens for instance in maritime regions of the world where the climate provides consistent rains. As a consequence of consistent rains certain plants have the ability to make water resistant roots that can reside in water cups that are filled or often filled for extended periods of time. In regions where rainfall is inconsistent, such as the North East, Mid-Atlantic, South-East and Midwest of North America, plant roots are not able to be submerged frequently, as they are soil based roots that require oxygen to survive. Roots can be replaced by the plant from an air-based root to a submerged underwater root but this replacement takes weeks. Hence, counting on diffusion or roots to empty out storage cups requires 7-21 days to take substantial effect. Once a storage cup or container is saturated (filled) it will not retain or detain rain water of any sizable consequence shortly thereafter. (for instance within 12-96 hours). Any of these before mentioned synthetic containment strategies once filled or filled at a capacity larger than the Flow Restrictor will overflow at the edges of the boards every 4 feet, or at the man-made gaps between the boards when custom fitted or adjusted for slopes. Overflow causes the water to quickly fall through the edges and when it hits the deck these systems facilitate the water in an expedited fashion to the drain. In practice, nearly all such cup-type drainage composites are utilized to increase retention due to impracticality of utilizing as detention.

One embodiment of a high-volume cup-type drainage plate is the Meander Panel by Optigreen. This drainage plate cups retain storm water per square foot of surface area, and utilizes cups joined by shallow channels at the top of each cup, allowing the top of water to flow from one cup to the next. Despite the ability of water to flow from one cup to another, the Meander Panel is a retention device, not a detention device, as once reaching capacity, each additional input of water results in an immediate equal volume of runoff, and as substantially all water captured by the Meander Panel may only leave the panel via evaporative processes, such as uptake by plant roots then evapotranspiration by the plant, following a storm. The Meander Panel could incorporate orifices as flow restrictors, which would present the same problems of precision and clogging potential as the aforementioned tray and cup embodiments, yielding ineffective and/or unpredictable detention. Once the water passes through the profile and lands on the deck, the drainage capacity of the Meander Panel facilitates the water in an expedited fashion to the drain, thereby missing the opportunity to create a more substantial time delay from where it hit the horizontal deck to the drain.

Continuous delayed flow is a rooftop storm water management strategy that incorporates two elements: a flow area and a point of discharge. The flow area is a substantially horizontal surface that receives water and that allows water to flow toward the point of discharge. The point of discharge is the location at which water exits the flow area. Within a continuous delayed flow system, the flow area and point of discharge provide a measurable and substantially consistent resistance to water flow, that is, unlike containment, the point of discharge shall not present a higher resistance to flow than the flow area. Within a continuous delayed flow system, the flow area must be able to accept additional influx of water without immediately causing similar amounts of runoff, that is, the flow area must be able to temporarily absorb additional water inputs, slow down water flow, and allow water to continually flow through the system without immediately causing a substantially similar volume of water to exit the point of discharge.

One exemplary embodiment of continuous delayed flow is a coarse roof surface, which may create detention via a phenomenon called sheer resistance. One example of a coarse roof surface is a granulated sheet of modified bitumen membrane. Another such example of a coarse roof surface is the graveled surface of a built-up roof. As water falls onto and flows across such surfaces, sheer resistance slows down water flow within small crevices of the roof surface; as water flow increases to approximately 0.0625-inch or 0.125-inch over the coarse roof surface, water flow remains slower than a baseline condition of a smooth roof surface; however, as water flow increases further, the effect of sheer resistance decreases and becomes insignificant, allowing water to flow across the surface without any significant resistance and without any significant detention effect. In practice, coarse surfaces do not create any significant a peak flow delay and/or a peak flow lowering during a large 10-year or 25-year storm, or any rainfall over approximately 0.25 inches of volume.

Another exemplary embodiment of continuous delayed flow is utilization of flow channels to increase the distance water must flow across a surface, such as through a green roof profile; following the theory that increased distance will equate to increased time. One example is the Optigreen Triangular Drainage Channel. Such a strategy requires placement of flow channels to create a circuitous, or zigzag, route through the green roof profile. Allowing continuous drainage requires that the flow channels must have positive drainage, that is the flow channels must slope toward a drain. In practice, most roof surfaces do not allow adequate space for such a circuitous route to be created with a length that is substantially longer than a direct line from any given point to a drain. This approach although intuitively plausible does not offer the civil engineer a precise and predictable outflow. Further, water will not flow through such routes unless the routes provide lower resistance to flow than the surrounding matrix, and eliminating resistance from such routes accelerates drainage and thus eliminates any detention effect.

In certain exemplary embodiments, a green roof assembly may incorporate a drainage layer fabricated of synthetic materials. The drainage layer is typically the lowest layer in the green roof profile and is commonly designed to optimize drainage of excess storm water to roof drains. Such drainage layers are commonly utilized as a method of elevating the green roof above the roofing membrane to create an air gap through which water may flow without obstruction to roof drains. Such designs may also incorporate some degree of flow resistance.

One exemplary embodiment of a synthetic drainage composite includes a 3-dimensional plastic-type thread/wire filament layer, which can be configured to promote and/or facilitate water flow. One common example of such a drainage layer is Colbond 3611 by Bonar. The large 3-dimensional voids that are created by the drainage layer produce an expedited flow rate, effectively facilitating rapid movement of excess water from underneath the green roof assembly to roof drains, thereby minimizing a time delay and minimizing detention.

Another example of a synthetic drainage composite utilizes substantially horizontal plastic bands arranged in overlapping 3-dimensional pattern. An example is J-Drain 300. This type of drainage layer also contains large 3-dimensional open voids for drainage. Though this type of drain has a slimmer profile and appears to cause water to zigzag horizontally and/or vertically, this type of drainage composite has an unpredictable flow rate as the indentation of the cloth that is separating the media above randomly closes the 3-dimensional gap of the J-Drain 300 itself to an unknown value making this not a reliable and predictable detention tool for civil engineers to rely on.

Another example of a synthetic drainage composite is the Drainage Layer by Columbia Green Technologies, fabricated of tangled polyester filaments. This type of drainage layer also has as very high flow rate, which does not provide any significant detention effect. All three of the aforementioned drainage composite embodiments reduce maximum potential detention of the green roof layers above the drainage layers, by rapidly draining those layers above the drainage layer, decreasing the potential for water to completely fill up all available the pore space in soil and/or other materials.

Another embodiment of a synthetic drainage composite is constructed of substantially impervious, synthetic material, such as plastic, formed into plates with series of cup-shaped indentations that may or may not retain gravitational water. The downward facing sides of these indentations can be considered pedestals, legs, or columns that support the plate. Between these pedestals are large 3-dimensional voids that facilitate rapid flow of water to roof drains. Once water flows out of a drainage plate, the water flows below adjacent drainage plates, between pedestals, rapidly to roof drains, providing the effect of no significant detention.

Another embodiment of a green roof layer that may provide some continuous delayed flow is granular drainage material. Such a layer may be applied to a given thickness at the bottom of a green roof profile, and comprised of gravel, sand, lightweight aggregates, or similar annular materials. Inconsistencies of particle sizes and particle ranges do not allow for this material to offer an accurate and repeatable outcome that the civil engineer could reply on. Further, an installer would need to apply this in the correct density, and the correct precise thickness in order to achieve the required effect. Any change of density or column height (thickness of the profile) will have significant impact on the ability of the system to function. Both the consistency of the material and the required craftsmanship are unlikely to be executed consistently.

In summary, the prior art includes examples of continuous delayed flow that provide insignificant delay of flow, and thus insignificant detention via use of materials with large voids and/or large pore spaces. The prior art also includes examples of absorptive materials that allow water to pass through via an immediate kinetic action, which are effective at retention, but ineffective at detention. There is a need for materials that allow a slow passage of water through, to create effective detention.

SUMMARY

Certain exemplary green roofs can be installed using "green roof trays," also referred to as green roof modules or modular green roofs. In such an embodiment, a tray, or a substantially horizontal container, is filled with one or more of the above elements and/or layers. An array of trays can be arranged substantially as a horizontally extending plane. For example, if the trays are rectangular when viewed from above, the rectangular trays can be arranged to completely or partially cover a rectangular area of the underlying roof, thereby forming a modular green roof assembly.

Inherent to a modular design are joints between trays, or gaps between modules of green roof tray embodiments. These joints, no matter how tightly these trays were installed, will allow water the path of least resistance. Rain water that rapidly falls onto a soil/media surface of a tray will not enter the soil/media as fast as it will leave the profile through the gaps between the trays. Construction installation tolerances, particularly tolerances related to non-uniform roof surfaces, also necessitates some degree of joint or gap between modules. These joints are essentially 3-dimensional voids that facilitate drainage to roof drains in the same manner as drainage plates, i.e. without any significant detention. Further, most green roof trays are manufactured with irregular bottom planes such that the bottom of the green roof tray handles drainage substantially similarly to a drainage plate. Most green roof trays freely drain to a drain plate underside and/or voids between modules. An example of a common modular green roof is Live Roof.

Certain exemplary green roof tray embodiments can incorporate granular and/or gravel products that can fill up a void space between the green roof assembly and the roof surface, which can facilitate water retention by the green roof. Such use of a granular material in the joints of a modular green roof may provide some horticultural benefits and/or some modest retention benefits, but provides no detention benefit, as this material performs no differently from the aforementioned green roof media or gravel materials. The density and consistency of gap filling soils/media is less than the normal profile, and will act as a vertical water facilitator that allows the water to escape in between the trays nevertheless.

Other exemplary embodiments can be configured to create intentional outflow restriction across the green roof plane to create a purposeful and/or calculated outflow delay, which can make the green roof system act as a storm water management tool that causes a storm water volume outflow rate reduction and/or a peak outflow delay. That is, instead of facilitating outflow, certain exemplary embodiments can restrict outflow by slowing down the velocity of the water to a predetermined level so it can capitalize on temporarily filling all the void space in the green roof profile, and in some cases even above the green roof profile such as in the dimples of the soil and between a tightly vegetated canopy of plants. Such embodiments can release this water with a predetermined, purposeful, and/or predictable delay, even after repeated storm water events take place.

Thus, certain exemplary embodiments can be focused on detention of storm water. When the design of certain exemplary storm water management embodiments is focused primarily on detention, rather than retention, such designs can start from a worst case perspective, which can be a fully saturated green roof. Such designs can rely on hydrographs, which plot outflow from the green roof system once a saturated state has been reached. A hydrograph is a tool to illustrate performance, and the performance improvements become apparent when reading the hydrograph. In the hydrograph 1" of rainfall water can be added to model an even more severe scenario. Certain exemplary embodiments can even focus on "worst case scenarios," which in this case can mean that retention is not a critical aspect of the green roof, such as if yesterday it rained and now the green roof is fully saturated. In certain exemplary embodiments, the design emphasis can be on lowering the storm water peak outflow volume and/or delaying and/or flattening the storm water peak outflow. Certain exemplary embodiments can focus on how the green roof system behaves during a rain event that takes place after the green roof system has already reached a saturated state, which can be modeled and/or measured using 5 or 6 minute time brackets, or any other time bracket interval.

DETAILED DESCRIPTION

Certain exemplary embodiments can employ a "friction layer" strategy that causes a specific desired continuous delayed flow strategy as a primary part of green roof assembly and/or system. This strategy can rely on a new type of anti-drainage layer that can purposefully resist water flow and/or can provide localized upstream resistance and/or friction in the water flow on a level, fairly level (roof) plane, or sloped roof plane that ranges from 0-45 degrees. Applying such a strategy, certain exemplary embodiments can slow and/or delay the outflow of water, and/or can cause a predetermined, measurable, predictable, and/or temporary storm water outflow slowdown bottleneck within, and potentially through-out, some to all of the under drain, drainage layer, and/or friction layer of the green roof assembly. This delay can be sufficient for the storm water volume to temporarily "back up" and/or fully saturate most to all of the capillary and/or pore space of the green roofs profile during the peak release of the rain. As the friction layer releases water, potentially at a predetermined rate, during a large storm water event, the water can be prevented from escaping from underneath the green roof at the same rate as the rain event that is taking place. The friction layer can create a universal restriction within, along, and/or potentially throughout the plane, which can force the water to build upwards within the profile of the system. This means that the system can now utilize most to all of the pore space in one, some, or, in certain cases, all the layers of the green roof profile. In extreme cases, the water can even reach above the top layer of soil and/or can start filling up the empty space between the foliage of the plants, thereby temporarily storing even more water.

Certain exemplary embodiments can provide approximately 40% to approximately 70% peak flow reduction with substantially improved peak flow delay by replacing the drainage layer with a friction layer.

When a friction layer releases water at a slower predetermined rate, the storm water peak flow volume that will be released can be lower than the rain event. With such a design, the friction layer can:

lower the peak in the hydrograph, such that there is a lower "peak outflow" rate;

widen the peak in the hydrograph, such that there is a lower "peak outflow volume over a certain amount of time;"

delay the peak position over time on the hydrograph such that there is a substantial delay in the "peak flow;" and/or create a longer tail outflow which causes a prolonged overall event.

Figure 1:
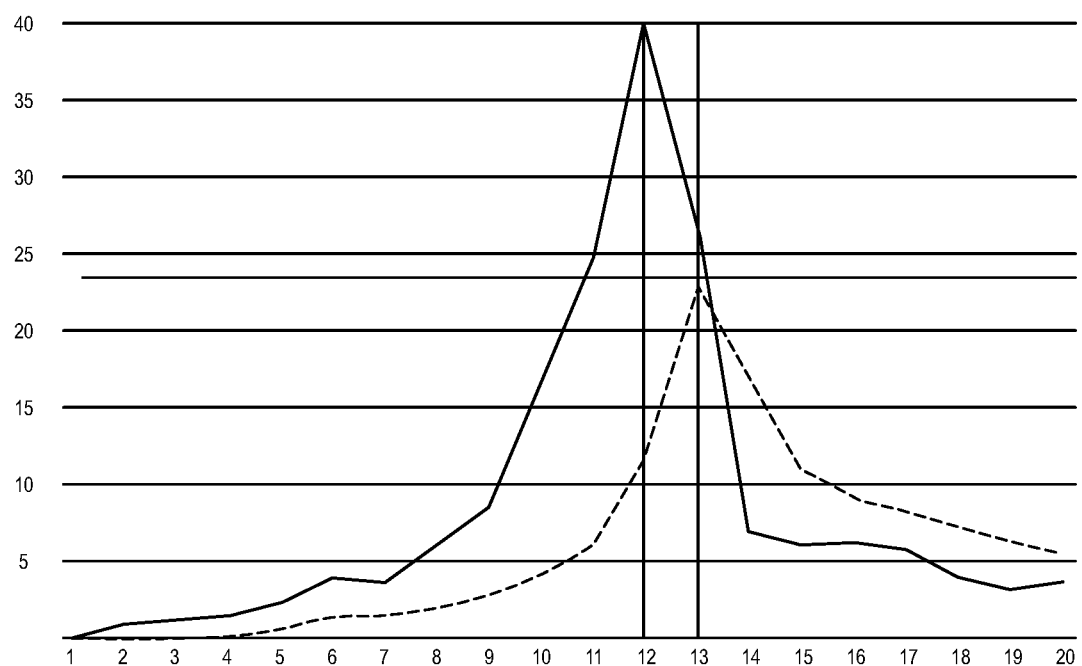
FIG. 1 is a graph of water outflow demonstrating the delayed outflow benefit of an embodiment of a green roof assembly described herein.

FIG. 1 depicts a graph of a water outflow rate over time, wherein the solid line is an exemplary green roof system without a friction layer and the dotted line is the same exemplary green roof system with a friction layer. The Y-axis displays gallons outflow rate per 6 minute interval and the X-axis displays 6 minute intervals.

In certain exemplary embodiments, the friction layer can have a storm water volume processing or facilitation speed determined by velocity restriction that is predetermined, predictable, and/or controlling of the capacity and/or time delays of the green roof system as a whole.

In certain exemplary embodiments, via a friction layer, water can be temporarily kept in place locally all across the complete plane of the deck. A friction layer need not concentrate the water in lower areas of the profile and/or roofing system. If areas of a friction layer clog, get compacted, or get damaged, the water can find alternative routes at substantially the same flow resistance levels. There need be no limiting holes or concentrating areas that can block water and/or allow a "metered" outflow.

Instead, each of the friction layer's integral flow restrictors can be formed in part from very thin threads, standing as a substantially vertically extending, yet somewhat leaky wall that is oriented substantially perpendicularly to the gravitationally-determined flow path, and thereby can cause fluidic friction and/or flow resistance. The flow restrictors can span between a top sheet and a bottom sheet, which combine to define the friction layer. The flow restrictors can be located at any of numerous locations within the friction layer and/or spread across the complete plane of the deck. Each flow restrictor can be constructed of approximately 50 to approximately 500 threads/square centimeter substantially aligned vertically standing threads, as measured in accordance with DIN EN 14971, April 2006 version. The flow restrictors can be machine made for optimum consistency and accuracy and/or can be reliably reproduced from the perspective of sheet and/or thread material and/or dimensions, thread spacing and/or density, thread angle and/or orientation, etc.

The friction layer can be frost and/or freeze/thaw resistant as it can expand and/or contract without substantial damage because the polyester or yarn of similar materials from which the threads are formed can be strong and/or flexible. The top sheet of the friction layer can have a root resistant tight weaving that can prevent roots from entering the friction layer. The bottom sheet of the friction layer can add structural strength to the standing fibers and/or the overall structure so that the friction layer has sufficient shape memory to bounce back up after pinpoint loading. For example, the friction layer at 10% compression can experience a compression stress of from 400 to 500 pounds/square foot, and/or when pressed down in the middle by a 10 cm×10 cm plunger.

The friction layer can be cut to accommodate nearly any slope, angle, and/or curve that is oriented in the horizontal and/or vertical plane, can be applied in any direction, and/or can be custom cut easily and/or quickly, even around penetrations and/or angular cuts. When installing the soft, damage-resistant friction layer, the roof need not require separate root protection and/or need not require a separate protection sheet to reduce and/or prevent manual and/or mechanical damage.

In certain exemplary embodiments, the green roof system's capacity to handle extra water flow can be increased by simply doubling or tripling the number of friction layers, with one layer laid above another, each layer extending substantially parallel to the other(s).

Using multiple friction layers and/or multiple dimensionally different friction layers, can be helpful in case of a sloped roof, where the downside of the slope has to deal with water from uphill plus the rainfall on the downslope itself. Multiple friction layers with different thread densities and thereby different flowrates, can be stacked to compensate for concentrated areas of water flow (think rectangular areas with a drain in the center).

In certain exemplary embodiments, the friction layer can be made with internally woven vertical walls of capillary strands and/or threads that can pull water from the deck zone upwards into the green roof profile, thereby helping to dry the roof deck. These vertical capillary walls can be even denser than the standard fibers of the friction layer and/or can be directed downhill as walls to help channel and/or expedite flow of the water. Conversely, these "vertical walls" inside the friction layer can be placed in the standard configuration, i.e., substantially perpendicular to the slope, to help to further slow down the water flow.

To reduce and/or avoid clogging over time, a friction layer can be topped and/or covered with a Filter Layer formed from mineral wool," such as from D135 Urbanscape Product from Knauf, which can have a very high density of fibers per cubic inch. This mineral wool can serve as an extreme filter that can substantially reduce and/or prevent the drainage aspect of the friction layer from becoming clogged.

Certain exemplary green roof systems can utilize any of 4 additional friction tools:

Slope: Any roof that is substantially flat and/or can be flatted can have better water detention capacities through the use of a friction layer. Increased slope can decrease the performance of the friction layer assembly as more water can sheet flow over the friction layer assembly towards the drains. "Peak flow" runoff rates typically are substantially higher on sloped roofs as the vegetation can be less effective in keeping the water in place on the top side and/or there can be more affect from gravitational forces and/or cohesion forces on the bottom side.

Vegetation: Rain water can vertically impact the green roof system at a downward speed of up to 20 mph or greater. Plants can help neutralize the energy that the falling water drop can enter the system with. When a raindrop hits a leaf, the leaf can absorb and/or dissipate a substantial portion the impact and/or the kinetic energy of the drop, and/or the drop can slowly seep downward into the soil, slowly moistening the soil layer. The vegetation can keep the soil underneath more moist than open soil. Moist soil can be better at receiving and/or absorbing water than dry soil. The dense and diverse vegetation can prevent and/or reduce lateral sheet flow, meaning that water can have difficulty finding alternative lateral routes, which can help and/or encourage the water to wait to percolate through the green roof profile.

Soil: Soil biology and soil density can influence the retention capability of a soil and/or flow rate through the soil. The tighter or denser the soil, the higher the likelihood that water will flow sideways into cracks and crevices vs. otherwise crashing down vertically.

Retention layer: A dense layer, such as formed by the millions of rock fibers of mineral wool, can have such a high adhesion capacity such that water can struggle to pass through this layer in a predictable fashion. This layer can filter out nearly anything that might otherwise clog the friction layer system over time.

Top: A tightly woven top sheet can resist root penetration and/or slow the water down as it tries to enter voids in the friction layer. Most vertical water flow through the top sheet can be due to capillary action vs. gravitational free fall through pores, open holes and other large gaps.

Vertical threads: Lateral flow and/or velocity can be slowed down by the vertical" density of approximately 50-500 threads/square centimeter that can slow the water velocity down to facilitate a peak flow delay and/or a peak flow volume reduction.

Via the application of a friction layer, certain exemplary embodiments can provide local outflow restriction of a green roof profile across complete plane of a green roof assembly, which can create a substantially predictable peak outflow rate reduction and/or a peak flow time delay in the outflow volume.

In certain exemplary embodiments, the friction layer can be composed of 2 layers of a cloth and/or sheeting material that can be machined, woven, weaved and/or some other manufacturing technique. Such material can have a relatively high density of polymeric (e.g., nylon) threads that can be standing vertically and/or angled in between the two sheets, thereby creating an elongated zone that can be substantially filled with threads that have the unique capacity to purposefully slow down the velocity of the water. This thread density (as the thread ends are viewed while looking down through the friction layer from the top sheet) can vary from approximately 50 threads/square centimeter to approximately 500 threads/square centimeter. Increasing the density of the threads can increase the velocity reduction capacity for water of a green roof or bio-retention assembly. The density of the nylon threads and/or the angle of the nylon threads can specifically lower the velocity of the water.

Figure 2:
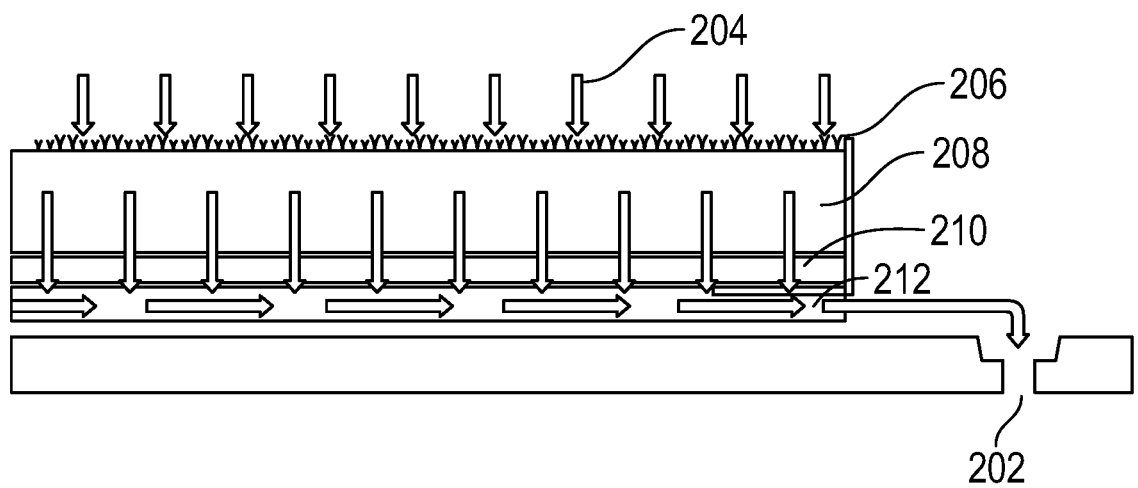
FIG. 2 is a schematic view of a side cross section of an embodiment of a green roof assembly described herein.
Figure 4A:
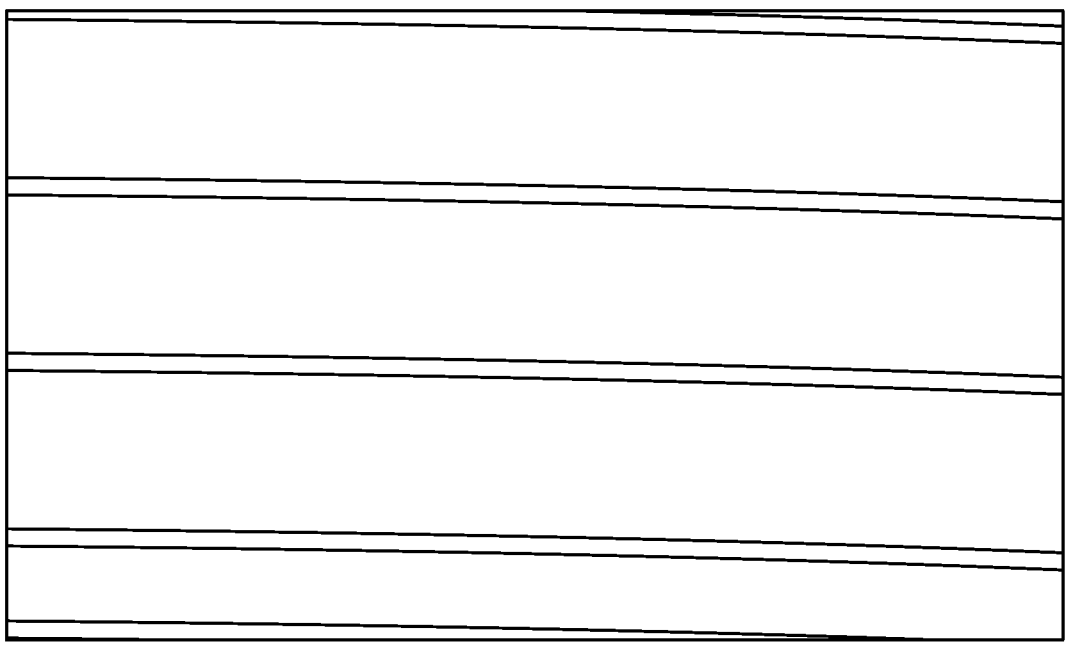
FIGS. 4A and 4B are top and side views of a frictional layer described herein.
Figure 4B:
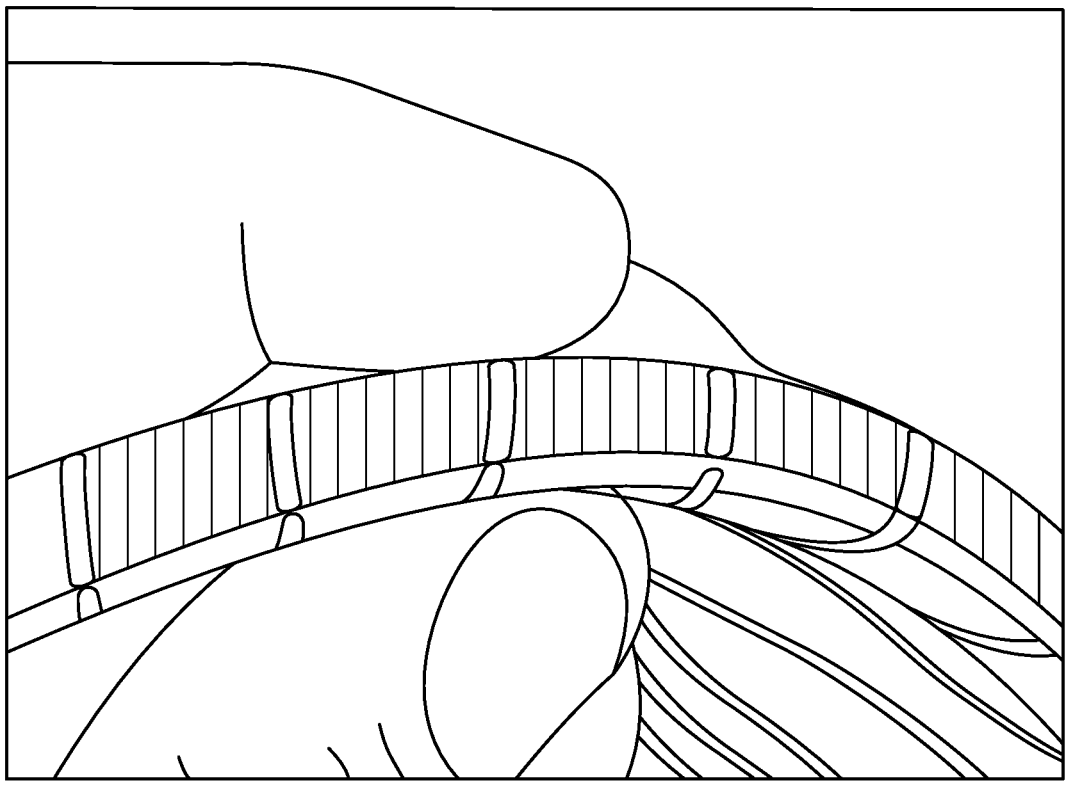

As shown in FIG. 2, a green roof assembly is provided with a friction layer which may be of the type further depicted in FIGS. 4A and 4B. As gravity draws water toward an outflow 202, rain fall 204 passing through vegetation 206 growing in sol or other media 208 atop a retention layer 210 atop a friction layer 212 Such a layer provides the desired density to limit or reduce water velocity thus providing a detention benefit to such a green roof assembly.

Certain exemplary embodiments of the friction layer can manage the storm water differently by altering any combination of these characteristics:

Changing the tightness of the woven top sheet can impact the flowrate. For example, the tighter the woven top sheet, the harder it can be for water to flow freely through that top sheet. A tightly woven top sheet can force the water to use capillary action to migrate through the sheet instead of pulled through by gravitational forces. Certain exemplary embodiments can be stitched with approximately 50 to approximately 300 stiches per square centimeter.

Changing the vertical column height of the threads can impact the flowrate. Certain exemplary embodiments can utilize thread heights ranging from approximately 0.2 mm to approximately 70 mm. By adjusting the column height certain exemplary embodiments can either store more or less water and facilitate or restrict the release of more water.

By changing the vertical thread count per square inch between approximately 50 and approximately 500 threads per square centimeter, certain exemplary embodiments can increase or decrease the velocity of water moving laterally through the friction layer.

Figure 3:
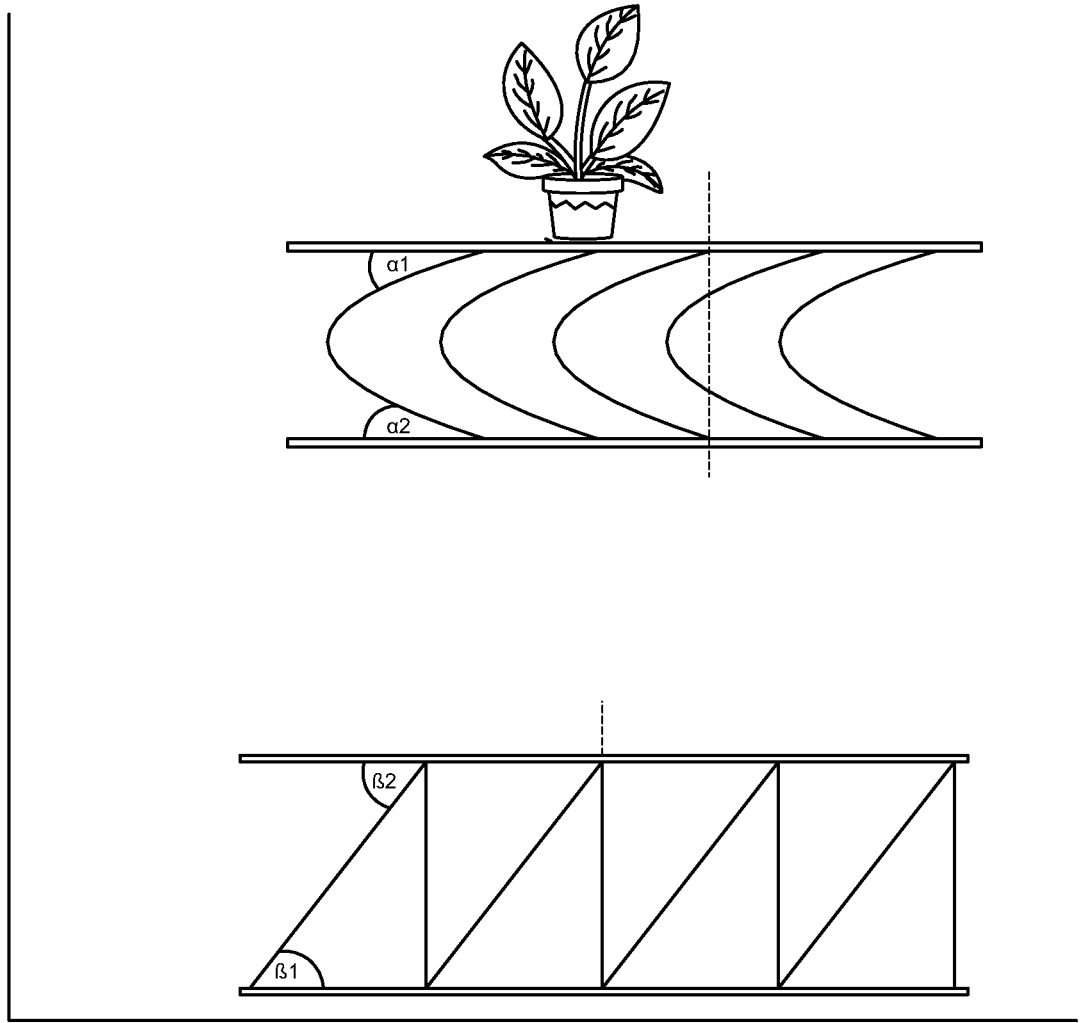
FIG. 3 is a depiction of potential embodiments of a frictional layer described herein.

Certain exemplary embodiments of the friction layer can change the angles of the threads, which can impact the outflow velocity of the water. That is, rather than extending only vertically between the top sheet and the bottom sheet, at least a portion of the threads can be angled with respect to vertical. This is shown in FIG. 3.

Certain exemplary embodiments of the friction layer can change the diameter of the threads (anywhere from approximately 0.05 to approximately 3 millimeters) either in combination with increased density of vertical threads or with a decreased density of vertical threads.

Certain exemplary embodiments of the friction layer can vary the shape of the threads when viewed in a horizontal direction, such as in profile and/or from a side of the green roof assembly. That is, threads can be straight, angled, sickle-shaped, zigzag shaped, saw tooth shaped, and/or any other shape. Such shapes can have a positive or negative impact structurally and/or on the ability of the friction layer to affect the velocity of water flowing within. By changing the thread type, certain exemplary embodiments can affect the velocity of the storm water.

One or more threads of the friction layer can be produced of a polymer, such as thermoplastic material selected from the group polypropylene, polyethylene, polyethylene terephthalate, polyester, and/or polyether sulfone and/or an inorganic fiber, such as glass and/or glass graphite form.

Certain exemplary embodiments of the friction layer can weave, into one or more friction layers, one or more threads and/or zones of threads that have different thread densities, those varied density threads available to act as wicking devices, channel guides, and/or additional vertical walls and/or barriers for the water to find additional velocity restrictions (see below).

Certain exemplary embodiments of the friction layer can offer detention capacity for one, multiple, and/or each subsequent storm, so the embodiment can be largely or fully drained within hours of the last storm water flow.

Certain exemplary embodiments of the friction layer can be calibrated, configured, and/or adjusted in density, thread type, thread height, and/or thread angle, etc., to substantially match the desired and/or required Design Storm. Calibration in this context means that the projected velocity and/or outflow rate of the friction layer cannot, will not, and/or is unlikely to quickly saturate, overflow, and/or cause most of the water to sheet flow to the drains. The calibration can make sure that the flow of all or most of the water of the Design storm will be temporarily detained by the friction layer and/or the green roof assembly, but ultimately all or most of the water will travel through the vertical column/profile, enter the friction layer and flow on to the drain.

Certain exemplary embodiments of the friction layer can provide the ability to withstand freeze/thaw cycles while, upon complete thawing, retaining its original shape and retention characteristics. Certain exemplary embodiments of the friction layer, via the integrity of certain utilized polymers, such as nylon, and/or the integrity of a utilized flexible assembly, can provide the friction layer with freeze/thaw damage resistant and/or freeze/thaw recovery.

Certain exemplary embodiments of the friction layer can accommodate a multitude of angles and/or slopes that can otherwise interfere with using layers that are dimensionally fixed (plastic or hard board type materials), or that would need to be cut at angles, or that would need to accommodate slope angles that intersect, and/or present curved surfaces. Certain exemplary embodiments of the friction layer can be flexible, handle foot traffic well, function well at different angles without the need to be cut, and/or are not easily damaged.

Certain exemplary embodiments of the friction layer can be made from nylon, which can be UV resistant, rot resistant, non-organic, and/or capable of lasting for very long periods of time. Certain exemplary embodiments of the friction layer can be non-flammable. Certain exemplary embodiments of the friction layer can be substantially: distortion-free; durable; UV-resistant; substantially dimensionally stable when stressed by vertical pressure (e.g., retain from approximately 75% to 100% of its original height when subject to operable soil and/or rainwater vertical pressures; washable up to 60° C.; weather-resistant; and/or chemical-resistant.

Certain exemplary embodiments of the friction layer can be easily cut and/or altered with a scissors and/or utility knife to accommodate roof penetrations. Making a cut in the friction layer material need not drastically alter the behavior of the friction layer around the scar.

Certain exemplary embodiments of the friction layer, due to its design of vertical and/or curved threads and/or alignment of its threads, can bounce back to its original position after maximum compaction was achieved through temporary weight overload.

Certain exemplary embodiments of the friction layer can provide, between two sheets (e.g., its lower sheet and its upper sheet), a plurality (and preferably approximately 50 to approximately 500) of crescent-shaped spacer thread portions per square centimeter, which can be formed of a single monofilament and/or can each extend in a substantially vertical plane. To this end, the monofilament can be entangled with the top sheet and/or the bottom sheet. Such entanglement can form a firm connection between the monofilament spacer thread portions and the two sheets.

In certain exemplary embodiments, a plurality of threads can be provided between the lower sheet and the upper sheet, wherein each thread extends:
  substantially diagonally between the lower sheet and the upper sheet;
  at a substantially predetermined angle with respect to the lower sheet and/or with respect to the upper sheet;
  at a common (among the plurality of threads) substantially predetermined angle with respect to the lower sheet and/or with respect to the upper sheet;
  in a corresponding substantially vertical plane between the lower sheet and the upper sheet;
  in a corresponding substantially non-vertical plane between the lower sheet and the upper sheet;
  non-planarly between the lower sheet and the upper sheet; and/or
  in substantially random direction between the lower sheet and the upper sheet.

Certain exemplary embodiments of the friction layer can be machine made. Thread diameter, thread density, and/or thread angles of the friction layer can be specified and/or can be produced according to specifications. Certain exemplary embodiments of the friction layer can repeatedly produce substantially the same peak flow delay and/or peak flow volume reduction.

Certain exemplary embodiments of the friction layer can be used with dense mineral wool to help keep the friction layer from clogging. For example, a layer of dense mineral wool can be applied over the friction layer.

To build certain exemplary embodiments of a green roof assembly that utilizes one or more friction layers can involve: the following Determining the storm water requirements for the specific roof;

Calculating the calibration, location, and/or type of material to meet the relevant storm water requirements;

Cleaning the roof deck;

Applying the friction layer on top of the roof, cutting holes (typically using scissors and/or a utility knife) as needed to accommodate penetrations and/or unusual building shapes;

Setting green roof edging or parameter containment around edges and penetrations of the roof;

Applying, over the friction layer, a layer of mineral wool that is configured to act as a system filter to prevent and/or defer the friction layer from clogging over time;

Applying compacted soil on top of the mineral wool;

Applying and/or planting vegetation in or on top of the soil.

Across the world, there are many installations of amenity space where people congregate on a building rooftop for relaxation, entertainment, and/or aesthetic purposes. There are many roofs where the edges of the roof are considered "wind uplift areas," where currently pavers or large gravel is used as ballast to keep the wind from damaging that area of the building and/or to keep the wind from blowing off overburden that is placed on top of the roof.

A green roof can be considered overburden. A green roof might need to remain a certain distance from the corners of the roof, which can be the most wind uplift sensitive areas of the roof, and/or the edges of the roof, which can be the second most wind uplift prone areas of the roof. Pavers can be spaced distances of approximately 2 feet to approximately 8 feet from the edges, and/or the edges and/or the corners can account for a large area of the roof. Large 24"×24" flat pavers can be placed in the wind uplift areas of a building. These pavers can be placed on pedestals. Alternatively, pavers can be laid directly on top of the roof and/or on top of an insulation layer that is laid on top of the roof.

One concern about these wind uplift areas is that they might not substantially retain and/or detain storm water in a rain event. Quite the contrary, they can be hard surfaces that can facilitate water movement above and/or underneath, which can allow, encourage, and/or force the water to flow to the drain in an expedited fashion.

Placing these pavers on top of a friction layer assembly, such as described herein, can allow these areas of the roof to be useful storm water management tools that can help solve storm water problems. In certain exemplary embodiments, a Paver Storm water assembly can temporarily retain and/or detain storm water and thereby cause an intentional peak outflow reduction and/or peak outflow delay.

Figure 5:
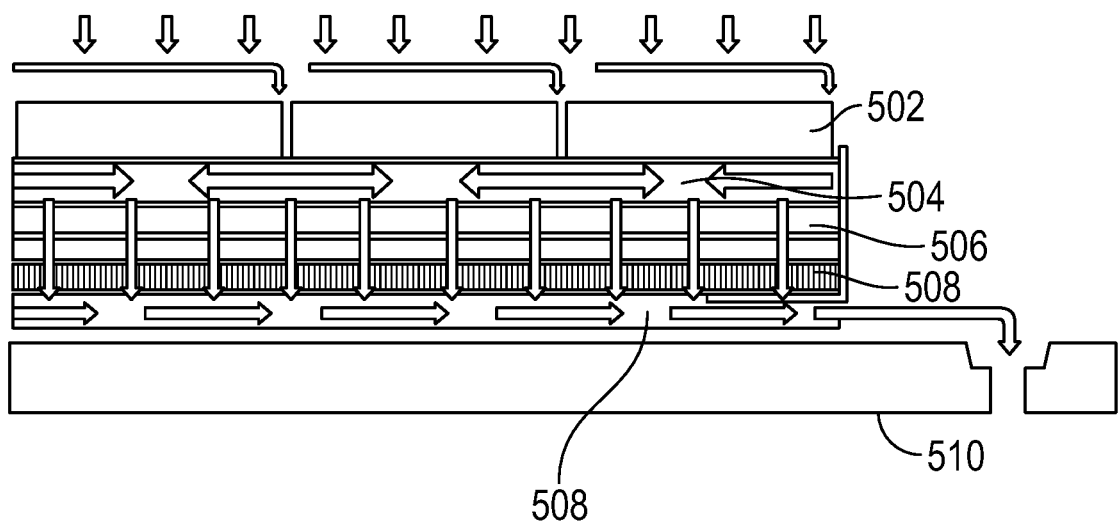
FIG. 5 is a schematic view of a side cross section of an embodiment of a green roof assembly described herein provided with pavers or ballast.

The Paver Storm water assembly, such as depicted in FIG. 5, can combine some or all of the following: ballast 502; water distribution layers or drainage layers 504; retention layers 506; and friction layers 508; over any area of the roof, such as over one or more wind uplift areas. A Paver Storm water assembly can be assembled within a confined outer wall edging (e.g., L-bracket) 510 or other parameter containment that can have perforations at its base configured for excess water to flow out. Optionally, the edging may be non-perforated and terminate (in the downward direction) between the friction layer and detention layer, or between friction layers.

In certain exemplary embodiments, the Paver Storm water assembly can include and/or rely on a load, such as a layer of ballast, which can pass the inbound rainwater into the Paver Storm water assembly. This ballast can be: a layer of pavers residing on or at the top of this assembly and/or on raised pedestals; a layer of large rock; a layer of perforated grid like frames; and/or anything that is sufficiently heavy to prevent windup lift and/or allow water to go through. In some embodiments, pavers in the size of 24 inches by 24 inches at various thicknesses can be used in this assembly. Gaps in between the pavers or other perforations can allow the storm water to fall through.

The storm water can pass into a void underneath the ballast and within the Paver Storm water assembly. Within the void, lateral flow can be influenced by a friction layer, which can allow the water to disperse substantially evenly and/or potentially throughout the full width of the Paver Storm water assembly (the friction layer might be replaced with a distribution layer and/or a green roof drainage layer).

A layer of mineral wool or some other type of retention device, with retention capacity of approximately 30% to approximately 95%, can retain water that falls deeper into the Paver Storm water assembly.

As this retention capacity is exceeded by the volume of storm water that the system receives, excess water can continue to fall downwards into the friction layer which can be a single friction layer or an assembly of friction layers. Water temporarily detained in this friction layer can leave the system at the edges through perforated edging or other parameter containment that can be placed around the Paver Storm water assembly.

Within hours most of the water can leave all the layers except the retention layers. The distribution layers, Friction and/or detention layers, and/or retention layers can easily dehydrate between rain events, as air can flow relatively freely within the system. The evaporation of water from this assembly can be such that it can cool the area underneath the ballast for an extended period of time, as the water that evaporates can cool the overhead ballast and/or the roof deck.

Thus, in certain exemplary embodiments, the Paver Storm water assembly can direct concentrated water flow from the ballast, distribute it throughout the lateral plane, and/or retain and/or detain the storm water to solve storm water volume problems because it intentionally can cause a storm water peak outflow reduction and/or a peak outflow delay.

In certain exemplary embodiments, a Paver Storm water assembly can be constructed by:

Determining storm water requirements for the specific roof;

Calculating the calibration, location, and/or types of materials that can meet storm water requirements;

Cleaning the roof deck;

Applying the friction layer on top of the roof deck, cutting holes (typically using scissors and/or a utility knife) as needed to accommodate penetrations and/or unusual building shapes;

Setting edging or other parameter containment around the perimeter of the designated area and/or around penetrations of the roof;

Applying, above the friction layer, a layer of mineral wool that can act as a system filter to reduce and/or prevent clogging of the friction layer;

Applying any other desired soft layers; and/or

Capping the Assembly with pavers and/or other ballast.

Across the world, building owners are discovering the roof of a building to be valuable space to harvest energy from the sun via Solar Energy Farm systems. Such systems can be positioned on a frame structure that can angle solar panels towards the sun to optimally capture incident sunrays. These frames or structures can be attached to the building with anchors and/or bolts that penetrate the roof membrane, or the structure the solar panels are built on can be free floating on the roof and weighed down by pavers, metal beams, and/or other devices to ballast the solar panel structures sufficiently to prevent the wind from displacing them.

A solar energy farm can address an energy problem and can be seen as an environmentally sound solution that can be on equal footing with alternatives such as a green roof. But solar energy farms do not necessarily help solve or mitigate the storm water problem. Quite the contrary, a solar energy farm can complicate the problems as a raindrop that hits the solar panel can maintain a portion of its downward velocity as it slides off the slanted glass type surfaces onto the roof. The roof space under and around the solar panels can be vegetated with a green roof. However, the two technologies might be deemed a poor match, and managers and/or owners of solar energy farm might want to keep green roof maintenance people far away from their substantial capital investment in their solar energy farm.

Via certain exemplary embodiments, the friction layer can change that. Similar to a green roof, in order to utilize the solar energy farm roof as a useful storm water tool that can help solve their storm water problems, a solar farm storm water assembly can temporarily retain and/or detain the storm water volume and/or cause an intentional peak outflow reduction and/or peak outflow delay.

Figure 6:
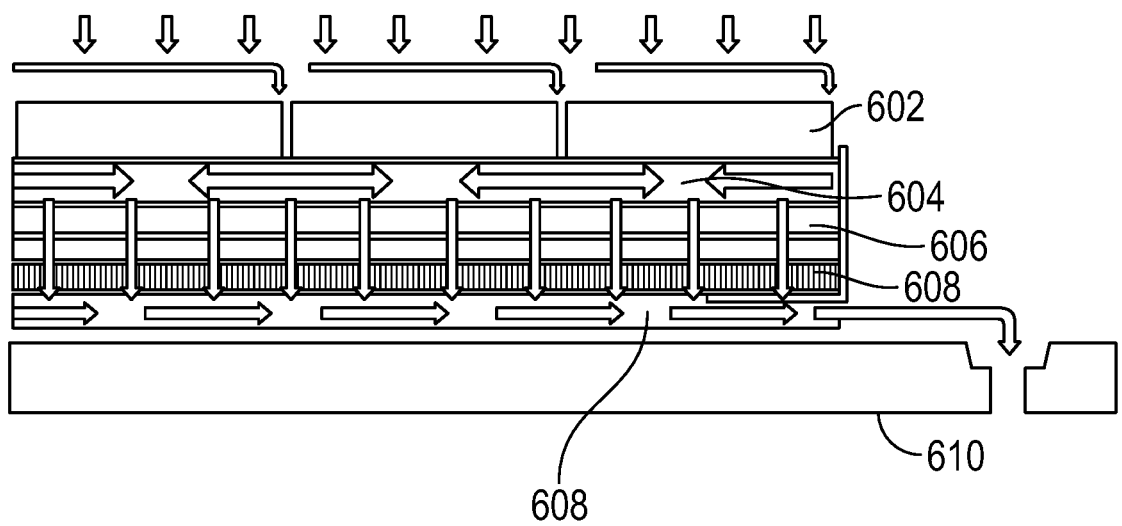
FIG. 6 is a schematic view of a side cross section of an embodiment of a green roof assembly described herein provided with a solar farm rooftop storm water solution.

A solar farm storm water assembly, such as depicted in FIG. 6, can combine some or all of the following: ballast 602; water distribution layers or drainage layers 604; retention layers 606; and friction layers 608; all assembled within a confined outer wall edging (e.g., an L-bracket) 610 or other parameter containment that can have perforations at its base configured for excess water to flow out.

In certain exemplary embodiments, the solar farm storm water assembly can include and/or rely on a layer of ballast, which can reduce the inbound velocity of water that sheet flows off of the solar panels and into the solar farm storm water assembly. Such a velocity reduction can help to reduce and/or prevent erosion, such as erosion of plants and/or soil utilized by the solar farm storm water assembly. This ballast can be: a layer of pavers residing on or at the top of this assembly and/or on raised pedestals; a layer of large rock; a layer of perforated grid-like frames; and/or anything that is sufficiently heavy and allows water to go through. In some embodiments, pavers in the size of 24 inches by 24 inches at various thicknesses can be used in this assembly. Gaps in between the pavers or other perforations can allow the storm water to fall through.

The storm water can pass into a void underneath the ballast and within the solar farm storm water assembly. Within the void, lateral flow can be now influenced by a friction layer, which can allow the water to disperse substantially evenly and/or potentially throughout the full width of the solar farm storm water assembly (the friction layer might be replaced with a distribution layer and/or a green roof drainage layer).

A layer of mineral wool or some other type of retention device, with retention capacity of approximately 30 to approximately 95%, can retain water that falls deeper into the solar farm storm water assembly.

As this retention capacity is exceeded by the volume of storm water that the system receives, excess water can continue to fall downwards into the friction layer which can be a single friction layer or an assembly of friction layers. Water temporarily detained in this friction layer can leave the system at the edges through perforated edging or other parameter containment that can be placed around the solar roof storm water assembly.

Within hours most of the water can leave all the layers except the retention layers. The distribution layers, Friction and/or detention layers, and/or retention layers can easily dehydrate between rain events, as air can flow freely within the system. The evaporation of water from this assembly can be such that it can cool the area underneath the ballast, the area beneath the solar panels, and/or the overhead solar roof system. This can be of benefit because some solar panels can be more efficient when operated in lower temperatures vs. high temperatures.

Regardless of whether the solar energy farm is attached to and/or assembled on the roof, or if it is free floating with ballast, the application of the solar farm storm water assembly can function substantially the same. In certain exemplary embodiments, the components of the assembly can be installed around the posts of the solar energy farm. Layers of the solar farm storm water assembly can be cut easily around obstacles. The weight of the solar farm storm water assembly can act as required ballast for the solar energy farm, which can save the building owner from having to create penetrations into the roof membrane to secure the solar energy farm to the building. This can save installation costs, and/or lower the risk for leaks substantially.

Thus, in certain exemplary embodiments, the solar farm storm water assembly can receive concentrated water flow from the solar panels, distribute it throughout the lateral plane, and/or retain and/or detain the storm water to solve storm water volume problems because it intentionally can cause a storm water peak outflow reduction and/or a peak outflow delay.

In certain exemplary embodiments, a solar farm storm water assembly can be constructed by:
Determining storm water requirements for the specific roof;
Calculating the calibration, location, and/or types of materials that can meet storm water requirements;
Cleaning the roof deck;
Applying the friction layer on top of the roof deck, cutting holes (typically using scissors and/or a utility knife) as needed to accommodate penetrations and/or unusual building shapes;
Setting edging or other parameter containment around the perimeter of the designated area and/or around penetrations of the roof;
Applying, above the friction layer, a layer of mineral wool that can act as a system filter to reduce and/or prevent clogging of the friction layer;
Applying any other desired soft layers; and/or
Capping the assembly with pavers and/or other ballast.

Figure 7:
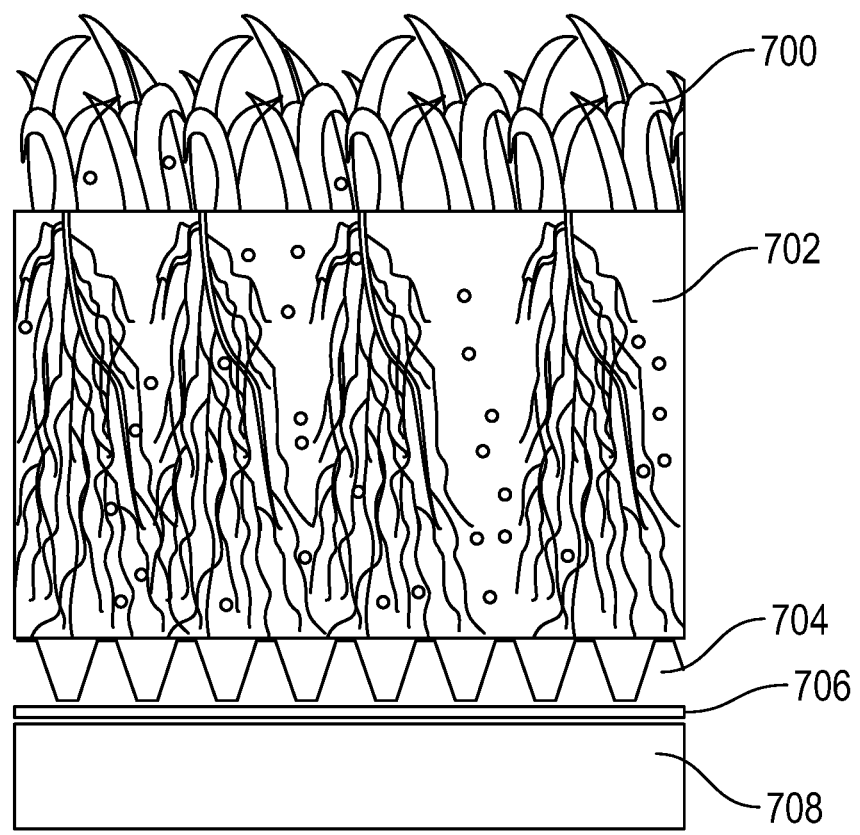
FIG. 7 is a schematic view of a side cross section of an embodiment of a green roof assembly described herein.
Figure 8:
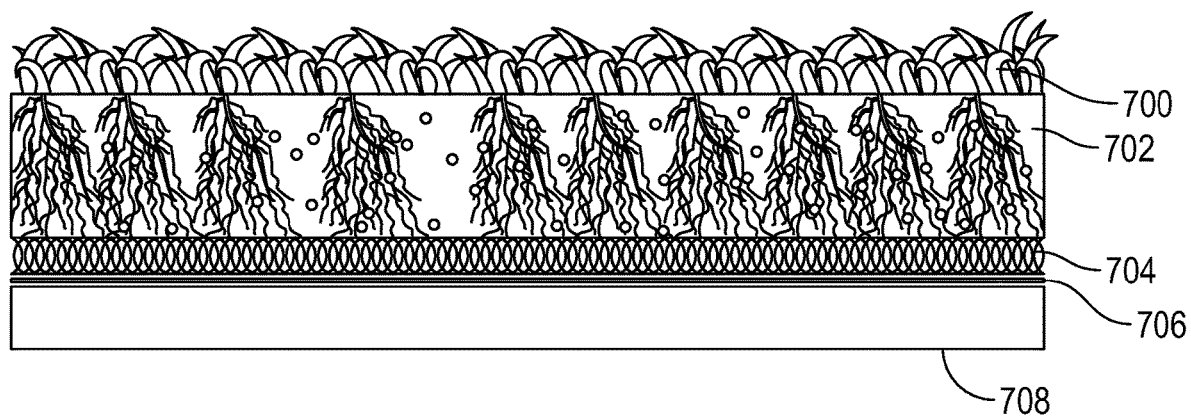
FIG. 8 is a schematic view of a side cross section of an embodiment of a green roof assembly described herein.
Figure 9:
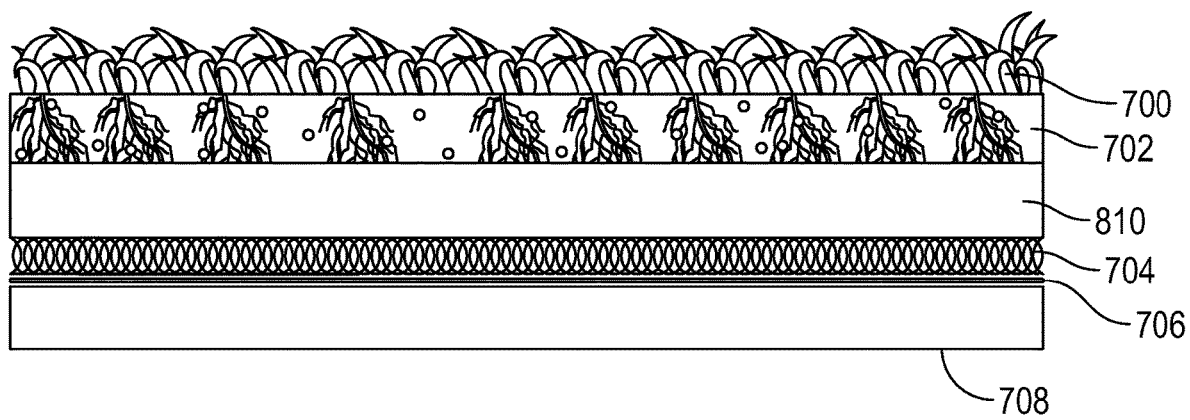
FIG. 9 is a schematic view of a side cross section of an embodiment of a green roof assembly described herein.
Figure 10:
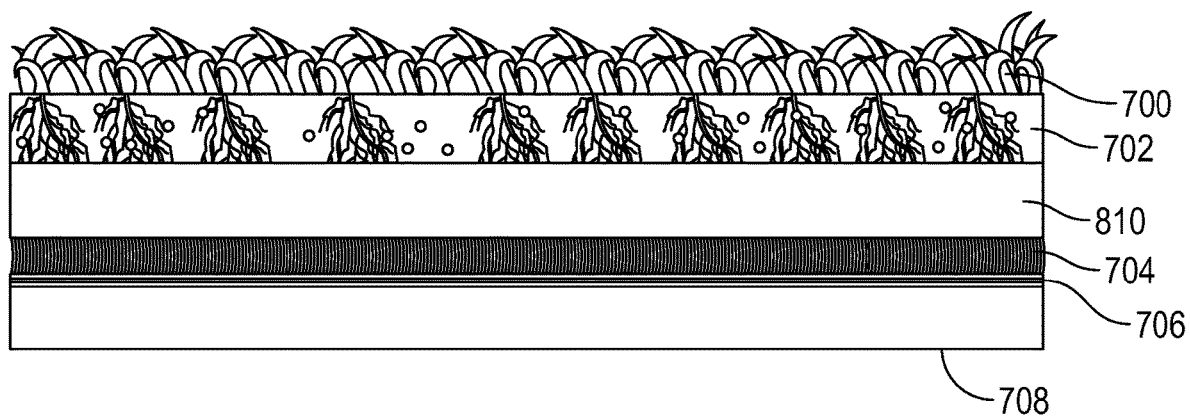
FIG. 10 is a schematic view of a side cross section of an embodiment of a green roof assembly described herein.
Figure 11:
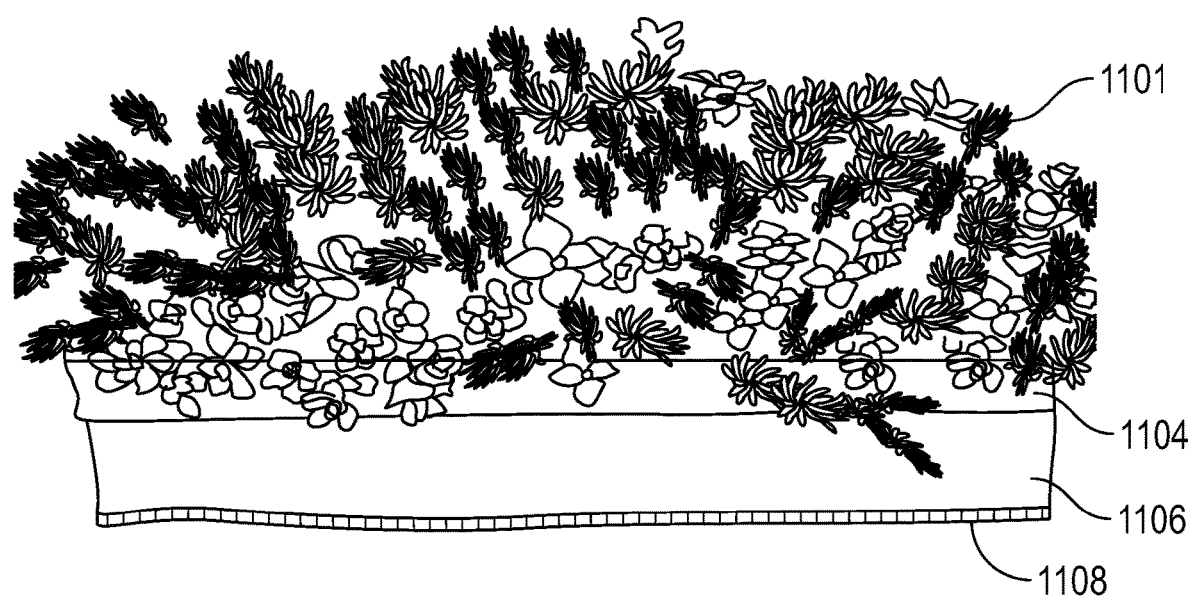
FIG. 11 is a depiction of a segment of an embodiment of a green roof assembly described herein.
Figure 12:
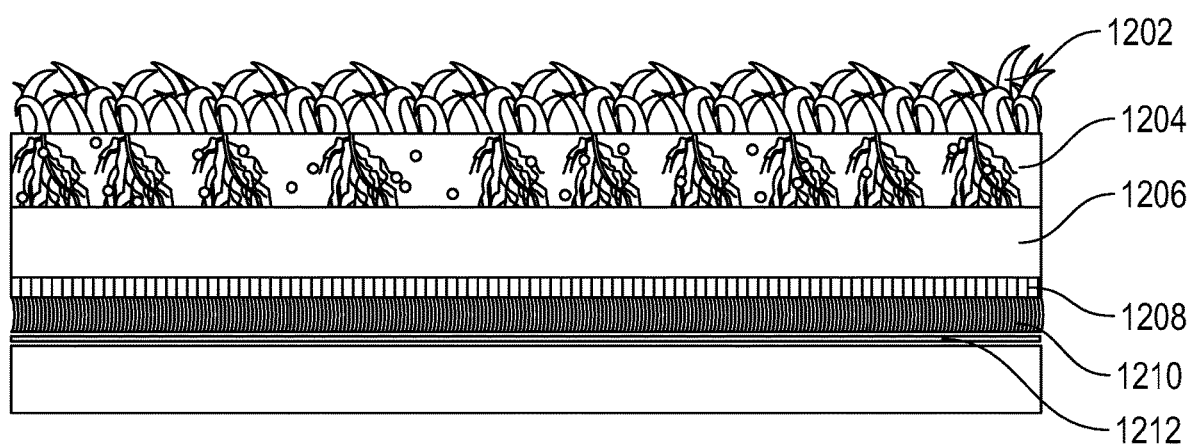
FIG. 12 is a schematic view of a side cross section of an embodiment of a green roof assembly described herein.
Figure 13A:
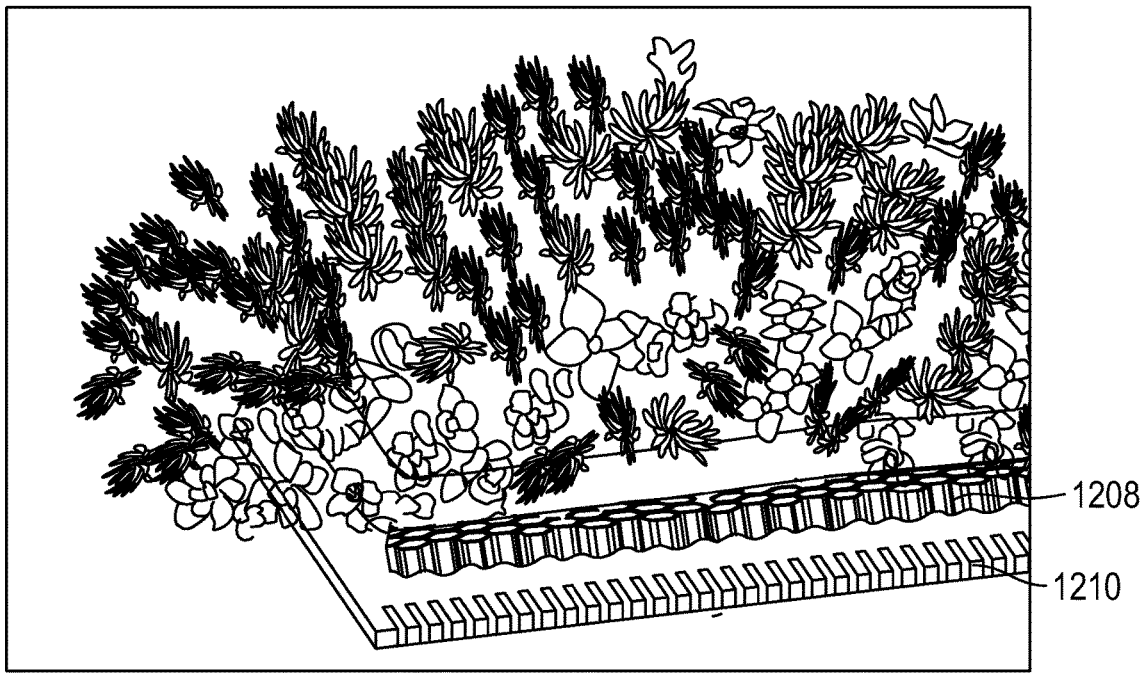
FIGS. 13A and 13B are depictions of a segment of an embodiment of a green roof assembly described herein.
Figure 13B:
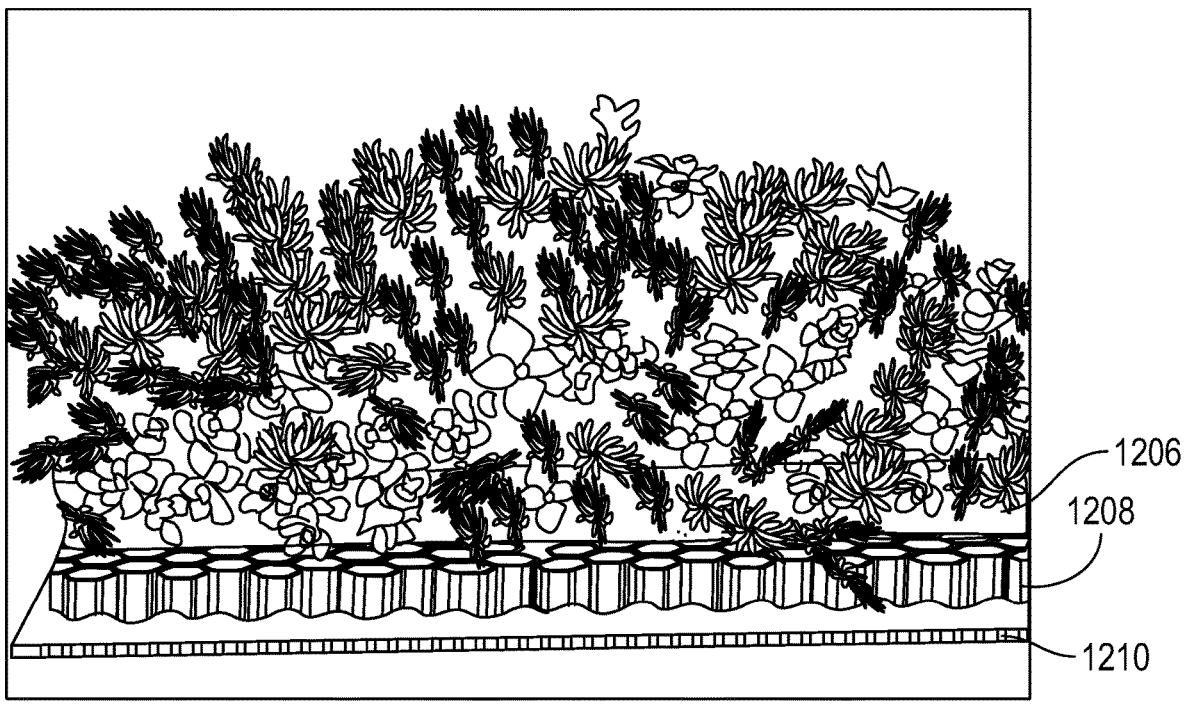

FIGS. 7-11 depict a green roof assemblies of embodiments disclosed herein. As shown in FIGS. 7 and 8, a traditional green roof may provide vegetation 700 growing in soil 702 on top of a drainage layer 704 which provides water outflow. This assembly may be installed on top of an existing or provided waterproof membrane 706 covering a roof structure 708. Referring to FIG. 9, such an assembly may additionally be provided with a layer of mineral wool 810 which may be a suitable thickness, for example, of four inches. Referring to FIG. 10, such an assembly may additionally be provided with a detention layer 912 as described in embodiments herein. As assembled, and shown in FIG. 11, a vegetation layer 1101 resides on a soil layer 1104 atop a layer of mineral wool 1106 and detention layer 1108.

Optionally, a woven cloth layer may be provided between each recited layer. In certain embodiments layers such as the soil layer may be omitted.

A Green Roof Assembly with a drainage layer may also be combined with an additional layer comprising a vertical honeycomb structure. In maritime climates (e.g., Prince Edward Island, Vancouver, Portland, Northern Europe) with consistent rainfall, green roof profiles may not need or do not have as much or not any soil (and thus lacking in macropores) a green roof may be assembled by placing the vegetation straight onto the needled mineral wool. Micropores in the needled mineral wool may thus be capillarily wet for an extended duration, with little or no macropores space to spare. Additionally, a system with substantial amounts of soil may exceed structural weight carrying capacity for a building.

Figure 14A:
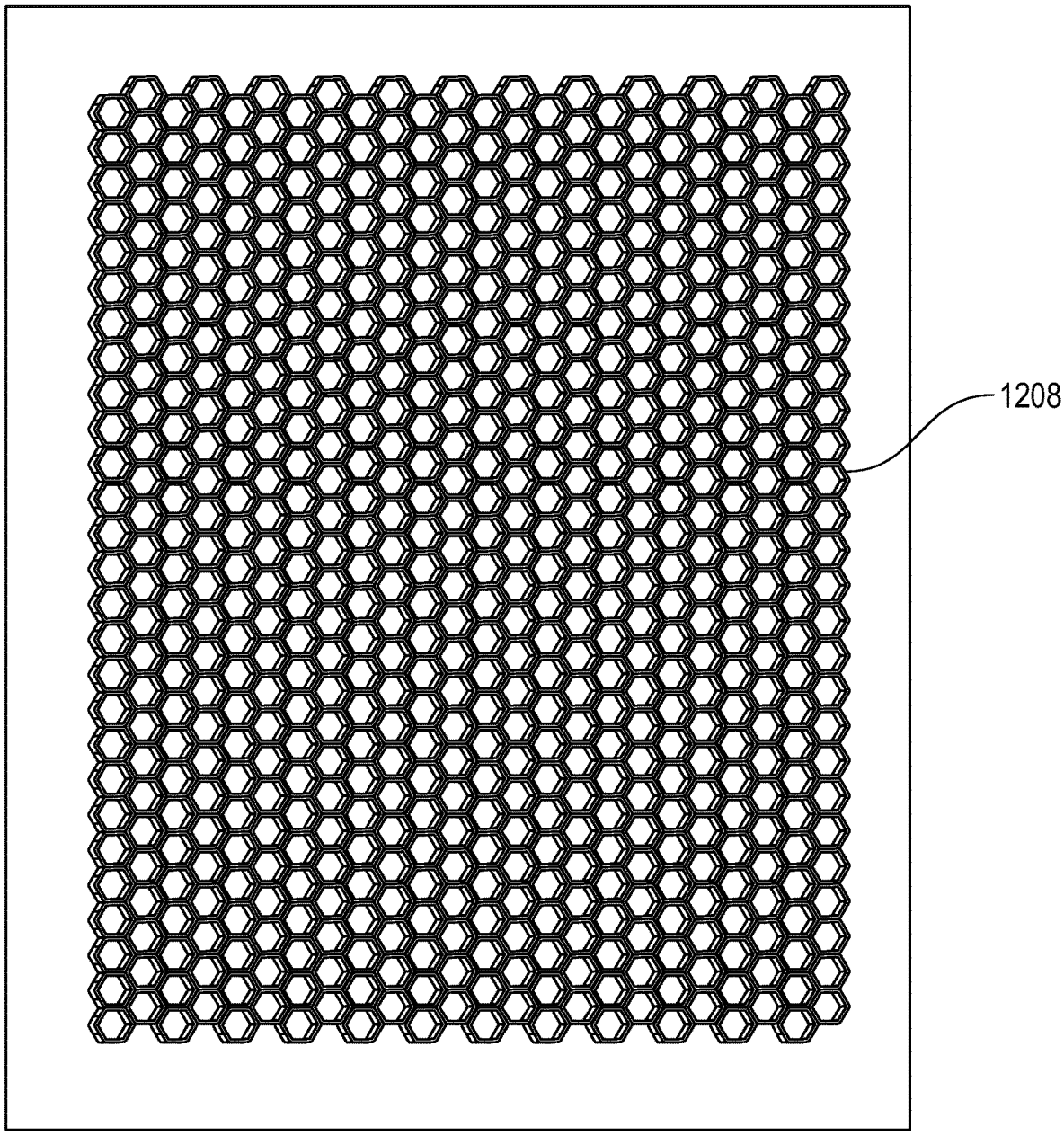
FIGS. 14A-C are depictions of a honeycomb layer as described herein.
Figure 14B:
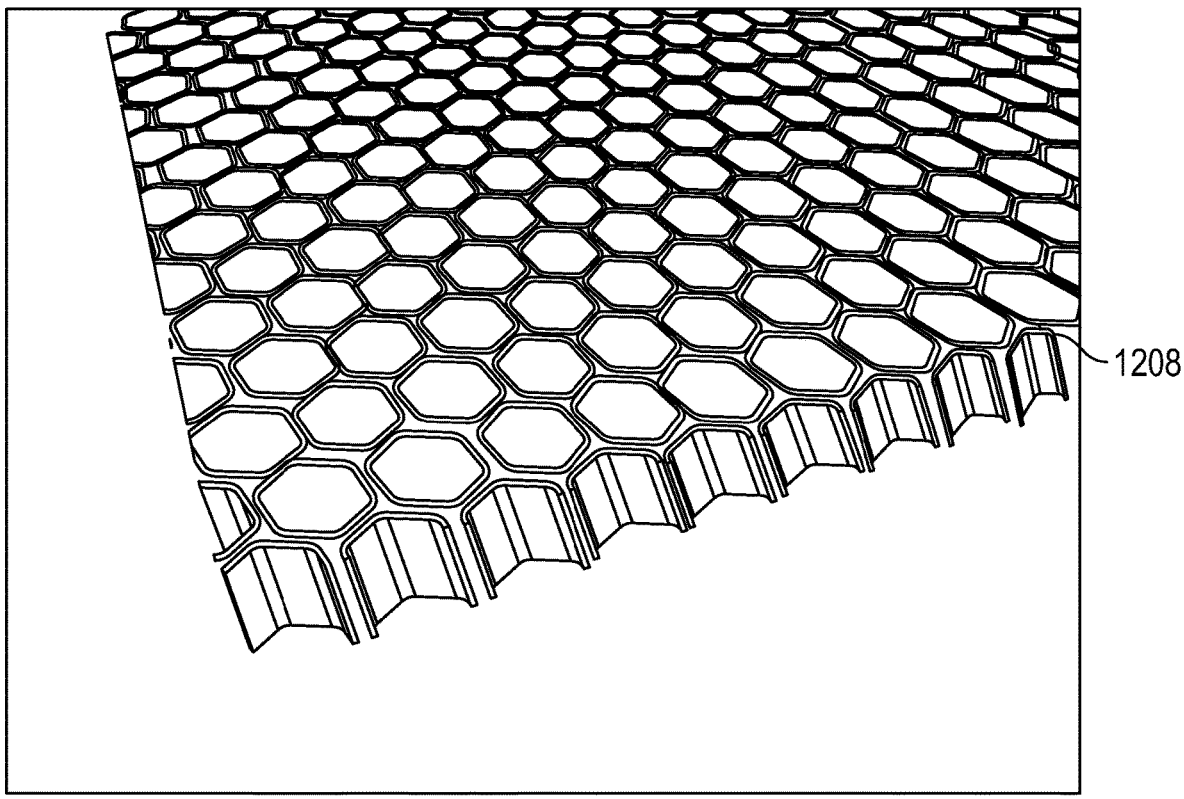
Figure 14C:
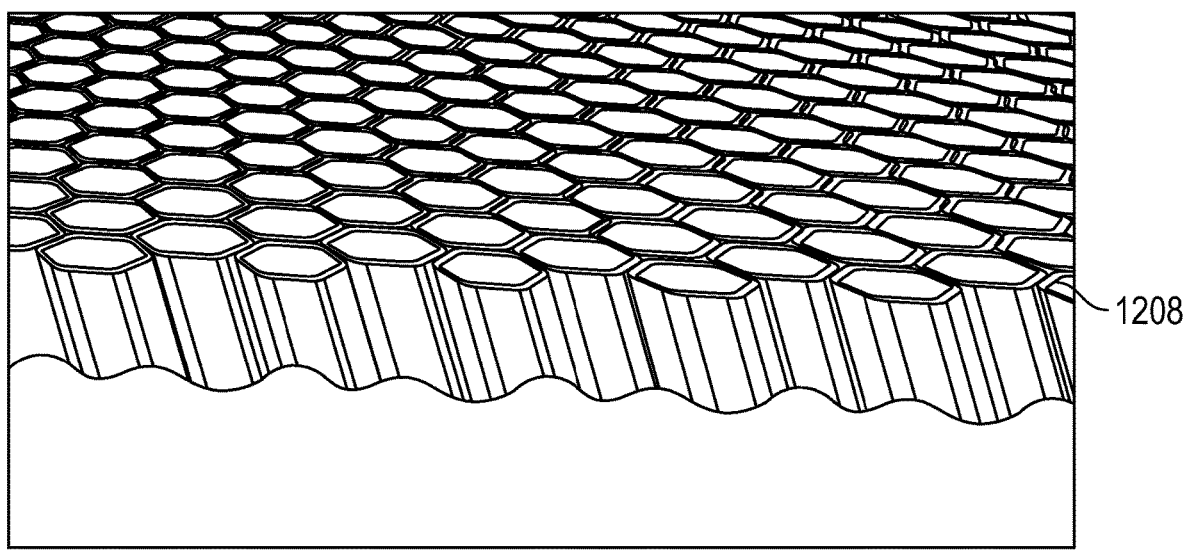

In order to provide a green roof assembly on roofs with weight bearing capacity constraints, or with thin soilless green roofs systems, a system may be provided with a 0.5-5 cm Honeycomb type structure on top of the detention layer to create a cavity underneath the green roof profile that can detain water and hold water in place while it waits for the detention layer to empty out. The honeycomb type vertical cylinders prevent lateral movement within that layer, and the water has to sit and wait until the space/water underneath has been vacated. Such a honeycomb layer is shown in FIGS. 12-13 and FIGS. 14A-C. A green roof assembly may be provided wherein, from top to bottom, a vegetation layer 1202 resides on top of approximately two inches of soil 1204, above approximately two inches of mineral wool 1206, above the honeycomb layer 1208, above a detention layer 1210 as described herein, on top of a layer of roofing material 1212. Optionally, a woven cloth layer may be provided between each recited layer. Such a green roof system may be integrated with edging bordering a gravel-based vegetation free zone, may be integrated with edging bordering a gravel-based vegetation free zone together with a height difference and a roof drain provided in the gravel layer, and may be integrated with edging bordering a paver system where pavers are provided on elevated pedestals above a honeycomb retention system as disclosed herein. In such a system, vegetation may serve to reduce the kinetic energy of falling rain, and further to provide retention for evaporation such as on the surfaces of leaves. Vegetation may also prevent excess lateral water flow thus preventing or reducing sheet flow. The soil may serve to offer a home to soil biology, roots, nutrients, water retention and detention (such as through soil macropores). A retention layer provided in such a system can absorb, hold, and easily release buffered water to the soil or plant roots. A retention layer is the soil separator that can filter water that flows downward, minimizing fine particles that may clog the detention layers or honeycomb. A honeycomb layer can create a volume of water underneath the profile that keeps the water from flowing sideways. The honeycomb creates a very effective void for temporary water storage, preventing lateral flow. FIGS. 14A-14C depict respective views of such a honeycomb layer. The interface of the honeycomb and disclosed detention layer provides an advantageous flexible communication to receive the honeycomb and partially seal the bottom of the honeycomb into the detention layer. This compensates for uneven roofs minimizing water that flows laterally underneath in case the detention layer would be full. Such a system may be adapted to steeper roofs by providing escape channels and periodic drainage layers.

Such a system provides increased, predictable, measurable repeatable detention under a green roof profile by creating a combination of void space (honeycomb) for storm water storage that simultaneously prevents lateral flow, which itself sits on top of a friction layer that creates a restricted outflow. Such a system may also be used for other green infrastructure applications such as biorentention ponds, sand filters, beneath pavers, and any other soil and plant-based storm water management system. Persons having skill in the art will recognize that a honeycomb structure may be substituted with any suitable vertical tube or columnar structure which provides little impedance to vertical flow but substantial resistance to horizontal flow. Persons having skill in the art will also recognize that the dimensions of such a system may be tailored using methods and techniques known in the art and as described herein. For example, a honeycomb layer may be provided in varying heights including, e.g., 5 cm in thickness or greater as material strength will allow.

Various substantially and specifically practical and useful exemplary embodiments are described herein, textually and/or graphically, including the best mode, if any, known to the inventor(s), for implementing the described subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the described subject matter to be practiced other than as specifically described herein. Accordingly, as permitted by law, the described subject matter includes and covers all variations, details, and equivalents of that described subject matter. Moreover, as permitted by law, every combination of the herein described characteristics, functions, activities, substances, and/or structural elements, and all possible variations, details, and equivalents thereof, is encompassed by the described subject matter unless otherwise clearly indicated herein, clearly and specifically disclaimed, or otherwise clearly inoperable or contradicted by context.

The use of any and all examples, or exemplary language (e.g., "such as") provided herein, is intended merely to better illuminate one or more embodiments and does not pose a limitation on the scope of any described subject matter unless otherwise stated. No language herein should be construed as indicating any described subject matter as essential to the practice of the described subject matter. The words and terms as used herein and in the accompanying claims should be read with the understanding of a person having ordinary skill in the art.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential;" and within, among, and between any described embodiments:

any two or more described substances can be mixed, combined, reacted, separated, and/or segregated;

any described characteristics, functions, activities, substances, and/or structural elements can be combined, integrated, segregated, and/or duplicated;

any described activity can be performed manually, semi-automatically, and/or automatically;

any described activity can be repeated, any activity can be combined with any other described activity, performed by multiple entities, and/or performed in multiple jurisdictions; and any described characteristic, function, activity, substance, and/or structural element can be specifically excluded, the sequence of activities can vary, and/or the interrelationship of structural elements can vary.

The use of the terms "a," "an," "said," "the," and/or similar referents in the context of describing various embodiments (especially in the context of any claims presented herein or in any document claiming priority hereto) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into and clearly implied as being presented within the specification as if it were individually recited herein. For example, if a range of 1 to 10 is described, even implicitly, unless otherwise stated, that range necessarily includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc., even if those specific values or specific sub-ranges are not explicitly stated.

When any phrase (i.e., one or more words) described herein or appearing in a claim of an application claiming priority hereto is followed by a drawing element number, that drawing element number is exemplary and non-limiting on the description and claim scope.

No claim of this document or any document claiming priority hereto is intended to invoke 35 USC 112(f) unless the precise phrase "means for" is followed by a gerund.

Any information in any material (e.g., a patent document such as a United States patent or United States patent application, or a non-patent reference, such as a book, article, web page, etc.) that has been incorporated by reference herein, is incorporated by reference herein in its entirety to its fullest enabling extent permitted by law yet only to the extent that no conflict exists between such information and the other statements and drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, and any provided definitions of the phrases used herein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

The invention claimed is:

1. An assembly configured to manage a flow of storm water that enters a drainage system of a roof, the assembly comprising:
    a plurality of substantially horizontally extending layers, those layers comprising:
        a solar panel support layer,
        a retention layer,
        a friction layer,
        the friction layer comprised of a top sheet and a bottom sheet joined by a plurality of substantially vertically-oriented pliable threads, the bottom sheet and top sheet comprising a woven synthetic polymeric material,
        wherein when the plurality of substantially horizontally extending layers are saturated, the friction layer is configured with a tightly woven synthetic polymeric material of the top sheet and a dense thread count plurality of substantially vertically-oriented pliable threads to resist a peak outflow of storm water from the assembly into the roof drainage system.

2. The assembly of claim 1, further comprising a detention layer, the detention layer having a small vertical flow resistance and a large horizontal flow resistance, and further comprising a vertical polymeric honeycomb structure.

* * * * *